US010599830B2

(12) United States Patent
van 't Noordende

(10) Patent No.: US 10,599,830 B2
(45) Date of Patent: Mar. 24, 2020

(54) SYSTEM AND METHOD FOR CONTROLLED DECENTRALIZED AUTHORIZATION AND ACCESS FOR ELECTRONIC RECORDS

(71) Applicant: University of Amsterdam, Amsterdam (NL)

(72) Inventor: Guido van 't Noordende, Amsterdam (NL)

(73) Assignee: Northend Systems BV, Amsterdam (NL)

( * ) Notice: Subject to any disclaimer, the term of this patent is extended or adjusted under 35 U.S.C. 154(b) by 397 days.

(21) Appl. No.: 13/962,579

(22) Filed: Aug. 8, 2013

(65) Prior Publication Data

US 2014/0047513 A1 Feb. 13, 2014

Related U.S. Application Data

(60) Provisional application No. 61/680,922, filed on Aug. 8, 2012.

(51) Int. Cl.
*G06F 21/44* (2013.01)
*G06F 21/60* (2013.01)
(Continued)

(52) U.S. Cl.
CPC .............. *G06F 21/44* (2013.01); *G06F 21/45* (2013.01); *G06F 21/604* (2013.01);
(Continued)

(58) Field of Classification Search
CPC .............. H04L 9/00; H04L 9/32–3297; H04L 63/0823; H04L 63/101; H04L 63/083;
(Continued)

(56) References Cited

U.S. PATENT DOCUMENTS 6,360,254 B1 * 3/2002 Linden .................... G06F 21/31
709/219
8,341,714 B2 12/2012 Muller et al.
(Continued)

OTHER PUBLICATIONS

Guido van 't Noordende, Security in the Dutch Electronic Patient Record System, SPIMACS'IO, Oct. 8, 2010, Chicago, Illinois, USA, Copyright 2010 ACM 978-1-4503-0094-0/10/10.*
(Continued)

*Primary Examiner* — Kevin Bechtel
*Assistant Examiner* — Quazi Farooqui
(74) *Attorney, Agent, or Firm* — The Webb Law Firm

(57) ABSTRACT

A system and computer-implemented method for providing decentralized access to records. The method is performed on at least one computer system including at least one processor. The method includes the steps of: generating at least one reference for at least one record stored on a source system, the at least one reference comprising authorization information and a pointer to the at least one record; receiving, at the source system from a client system, a request to retrieve the at least one record from the source system, the request initiated using the at least one reference and including at least a portion of the at least one reference; authenticating or authorizing at least one of the client system and a user of the client system; and transmitting the at least one record from the source system to the client system.

39 Claims, 3 Drawing Sheets

(51) Int. Cl.
　　*H04L 29/06* (2006.01)
　　*G06F 21/45* (2013.01)
(52) U.S. Cl.
　　CPC .. *H04L 63/0823* (2013.01); *G06F 2221/2153* (2013.01); *H04L 63/083* (2013.01); *H04L 63/101* (2013.01)
(58) Field of Classification Search
　　CPC .......... G06F 15/16; G06F 21/44; G06F 21/45; G06F 21/604; G06F 2221/2153
　　USPC ......... 713/168–174, 182–186, 202; 709/206, 709/225, 229, 249, 389; 726/2–8, 17, 18, 726/19, 28
　　See application file for complete search history.

(56) References Cited

U.S. PATENT DOCUMENTS

| | | | |
|---|---|---|---|
| 8,628,019 B2* | 1/2014 | Audebert et al. | 235/492 |
| 2007/0101440 A1* | 5/2007 | Bhatia et al. | 726/28 |
| 2009/0240681 A1* | 9/2009 | Saddiqi et al. | 707/5 |
| 2009/0320118 A1* | 12/2009 | Muller et al. | 726/9 |

OTHER PUBLICATIONS

Guido van 't Noordende (hereinafter NOORDENDE 2010 Publication), Security in the Dutch Electronic Patient Record System, SPIMACS'IO, Oct. 8, 2010, Chicago, Illinois, USA, Copyright 2010 ACM 978-1-4503-0094-0/10/10.*

R. Anderson. A Security Policy Model for Clinical Information Systems. IEEE Symposium on Security and Privacy. Oakland, U.S.A. 1996.

G. Van 'T Noordende, "Security in the Dutch Electronic Patient Record System", 2nd ACM Workshop on Security and Privacy in Medical and Home-Care Systems (SPIMACS), Chicago, Illinois, USA, Oct. 8, 2010. (with ACM CCS). pp. 21-31.

G. Van 'T Noordende, "Controlled Dissemination of Electronic Medical Records", 2nd workshop on health security and privacy (HealthSec) 2011, Usenix security symposium, San Francisco. Aug. 9, 2011.

M. Winandy. "A Note on Security in the Card Management System of the German E-Health Card." 3d ICST Conf. Electronic Healthcare for the 21st Century. Marocco. 2010.

* cited by examiner

SYSTEM AND METHOD FOR CONTROLLED DECENTRALIZED AUTHORIZATION AND ACCESS FOR ELECTRONIC RECORDS

CROSS REFERENCE TO RELATED APPLICATION

This application claims priority to U.S. Provisional Patent Application No. 61/680,922 filed Aug. 8, 2012, entitled "System and Method for Controlled Decentralized Authorization and Access for Electronic Records", the entire disclosure of which is herein incorporated by reference.

BACKGROUND OF THE INVENTION

Field of the Invention

The present invention relates generally to managing access to data and, more specifically, managing access to decentrally stored data through the use of references.

Description of Related Art

Healthcare is becoming increasingly complex, with an rising elderly population, increasingly complex diseases and treatments, and a corresponding increase of specialized clinics and physicians. As a result, patients are becoming increasingly mobile, and there is an increasing need for mechanisms to exchange medical information between physicians in different organizations in an efficient way.

Various attempts have been made over the last decade, particularly in Europe, to construct national-scale infrastructures for exchanging electronic medical records between physicians. Security and privacy remain a challenge in all of these systems. Most of the risks in existing systems arise from the large scale and centralized architecture of these (pull-based) systems.

Pull-based systems, as used herein, means that a physician can "pull" information about a patient from another physician's system (or from another system in general). A characteristic of pull-based systems is that, typically, the person who "pulls" the information is not a priori known or, if known, the system is unaware of the particular person that retrieves the information. Information is provided automatically by the system, without the doctor responsible for this record being aware of the retrieval at the time this happens. Pull-based approaches to exchange medical information are useful because, at the time of access, the most up-to-date information is obtained. For example, if a patient is referred to a specialist, a general practitioner (GP) can send a message containing a breakdown of the most relevant information about the patient to that specialist. However, it is conceivable that further relevant information which is not known at the time of making the referral (e.g., a lab result which is due to return) will be integrated in the referring GP's system after constructing the referral message. The specialist sees the referral message, but not the relevant updates. If a pointer to a record (containing the referral message, possibly as typed in by the GP and/or in part automatically 'extracted' by the GP's own system from patient data stored in that system) is passed to the specialist instead, or if this information can be pulled in some other way, updates will be visible at the time that the patient is with the specialist (which may be some days or even weeks after the referral letter was sent out). This motivates the use of pull-based access instead of "push" based information exchange. Push information exchange is typically implemented by sending a static message to another doctor. This proposal can pose a middle ground between push-based information exchange, which has the advantage that the information is passed to a specific healthcare professional or organization in a controlled way, and pull-based access, which ensures that access is provided to the most up to date information as present in the sender's system.

A centralized architecture may be understandable from the point of view of efficiency, control, the ability to manage access in a relatively simple way, and the ease of use from the clinical perspective in mind. However, a centralized infrastructure comes with various inherent security and privacy risks.

Efforts to (partially) centralize access to medical records continue to have disadvantages. For example, in the Dutch Electronic Patient Dossier (EPD) system, records remain under control of physicians in their own systems. Read-only access to patient records is provided through a central switching point, which contains a reference index per patient, where each reference points to a decentrally stored record of the patient. The system implements Role-Based Access Control (RBAC). Physicians or their employees can sign requests using a personal smartcard backed by a government Public Key Infrastructure (PKI). Certificates issued by a government-backed Certificate Authority (CA) indicate the profession/specialization and the name of the invoking healthcare professional, and this information is used by the switching point to make central access control decisions.

A security breach of the central switching point can lead to retrieval of any patient record in the system, since signatures over requests are not forwarded to the endpoints where the records are requested from. And even if these would be forwarded, an attacker with a (stolen, with PIN code) physician smartcard can obtain many records by sending requests to the endpoints where the patient records reside. Furthermore, a breach or other failure of the central switching point can lead to records becoming completely unavailable. The 'trust model' of the system thus depends crucially on reliability and operational security of the central switching point. Further, the indices and log files in the central infrastructure contain information about all treatment relationships of a patient. From this data, much can be derived about a patient's medical history, even when the information itself cannot be retrieved. The mere fact that a patient has a record at an oncological center or that a doctor at a rehab clinic looked at a record (as visible in the logs), leaks information about a patient. Such information should not be accessible for longer than necessary, and need not necessarily be centrally registered or accessible at all.

Additionally, requesting physicians are not known by the switching point (or the endpoint where the record resides) to have a 'treatment relation' with the patient, i.e., to be authorized by the patient. This means that, from a technical perspective, any physician with a valid certificate (with acceptable attributes, from the perspective of RBAC) can request information about any patient. Effectively, the Dutch EPD system relies on self-authorization of physicians; the switching point cannot verify whether a physician is authorized by the patient whose record is retrieved. This makes the system vulnerable to attacks using stolen smartcards (with PIN codes).

There also exists a delegation system in the Dutch EPD system, where an employee can claim to work for a physician, or change a table in the system to make it appear as if working for a physician, and request information on behalf of a physician in the same organization. When large organizations are attached to the switching point, it becomes evident that delegation of authority to access the EPD system to employees, makes the system even more vulnerable to misuse or theft of employee smartcards (with PIN code) or to intrusions in the attached systems. These aspects make the system (including all source systems that provide access to patient records via the system) dependent on the (operational) security and trustworthiness of thousands of systems connected to the central switching point, including the users and administrators of these systems. The impact of a possible intrusion can be very large due to the scale of the system, containing information about almost any person in a country and allowing information about most persons to be retrievable from any system in the country that is attached to the switching point. Role-based access control (RBAC) alone, as applied currently in the EPD and many other pull-based systems, will not help much to limit the impact of an intrusion, as basic information will usually be accessible from any RBAC-defined role. In particular, medication (prescriptions, pharmacist records) information is probably visible to most or all doctors. Some legal safeguards are proposed, but these will not deter all misuse at the scale of the EPD. The 'attack surface' is simply very large.

Not all systems have centralized switching points as the Dutch system does. Some have centralized 'indices' (which are usually protected using some form of RBAC based on some PKI or [distributed] identity management system), while the eventual requests for information are sent point-to-point (i.e., directly from client to server; the server is found in the index). Various architectural approaches exists. However, most if not all depend on a centralized (external) database which contains a list of references to records. These references are tied to the central system, as is (usually) access control, and access control is usually role based. The indices can be managed at various scales, from within a hospital (to couple systems in different departments or wards), within a small region consisting of various healthcare organizations (or possibly with different locations run by one organization), up to National scale. All of these approaches are vulnerable to attack on or failure of the centralized 'index' from an availability as well as a security (confidentiality, integrity) perspective. Furthermore, access control is generally not fine-grained (authorization is not specific) and patients have few options but to say "yes" or "no" to sharing information through such a system.

Current approaches like those proposed by IHE (Integrating Health Enterprises) for cross-enterprise document sharing, or by the Dutch government, essentially create a virtual database with a central index and/or a centralized access point, where role-based access control (RBAC) is used to determine whether some physician is allowed to access a record. However, such approaches are not able to verify that the physician is actually involved with treating the patient, nor do they in general provide a means for patients to verify or assess this in advance. This makes these approaches, particularly if applied at a large scale with many client systems and doctors or employees who can access the system, vulnerable to malicious or accidental attacks or incidents. It is debatable whether this can be regarded as 'adequate protection' of medical records—adequate security measurements are a requirement in Europe, for example, and also the European Court of Human Rights. One case decided by the European Court of Human Rights has indicated that, for example, hospitals must take appropriate measurements to prevent unauthorized personnel that is not (directly) involved with treatment from accessing records. It seems that current cross-enterprise/cross-organizational data sharing systems like those of the Dutch government (which have an even larger number of users) or IHE cannot meet this requirement.

Whether or not a central database is used, or a centralized 'reference index' combined with a centralized access (and access control) point (a central reference monitor), does not change or influence the risks caused by too many people having a role (function) that gives, in principle, access to medical information as is the case in a system with RBAC. The only way to reduce risk is to introduce proper authorization structures in the system, where physicians do not get access except when explicitly authorized. A conceivable middle ground is where a full ward or hospital (or organization, in general) is authorized, where this organization is responsible for internal authorization. However, this limits the 'attack surface' in that records can be accessed only from that explicitly authorized organization. Alternatively, a physician (or group or physicians) can be authorized, who can sign delegation certificates for employees to explicitly delegate authorization—assuming a public key cryptography based infrastructure. Requiring prior explicit authorization before granting access to records is feasible, although possibly there are situations where information (typically of a particular type only) should be available also without prior authorization (e.g., in emergencies). Thus, based on circumstances and a policy set for a given record (type), special approaches that use weaker authorization structures for particular records are conceivable.

Another aspect of risk is not so much the number of people who can potentially access patient information, or the number of systems from which patient information may be retrieved, but the mere existence of a central access point. If an intrusion (possibly from the inside) takes place in such a central facility, it may be possible to retrieve any record from the system without anyone noticing. Another vulnerability is that a central core component can become a single point of failure—both in the sense of availability but also in the sense of security.

When using decentralized access control (i.e., where the source system/server implements authentication of clients) in combination with a central reference index which is broadly accessible or which may be compromised—this approach is taken in some IHE standard-based systems—, risks exist too since the mere fact that some person has seen a specific doctor—think of a psychiatrist, a gynecologist, a doctor at a rehab clinic or a pharmacist next door of a rehab clinic, or an oncologist—can give away a lot of information about the patient, and can make the patient vulnerable to, for example, blackmail. So in general, it is also a good idea to avoid central reference indices if possible, even if the information itself is retrieved using a secure end-to-end mechanism.

Thus, there is a need for a decentralized approach to access to data, such as medical records, where patients and/or their physicians can control the disclosure of medical data.

SUMMARY OF THE INVENTION

According to a preferred and non-limiting embodiment of the present invention, provided is a computer-implemented method for providing decentralized access to records, the method performed on at least one computer system including at least one processor, the method comprising: generating at least one reference for at least one record stored on a source system, the at least one reference comprising authorization information and a pointer to the at least one record; receiving, at the source system from a client system, a request to retrieve the at least one record from the source system, the request initiated using the at least one reference and including at least a portion of the at least one reference; authenticating or authorizing at least one of the client system and a user of the client system; and transmitting the at least one record from the source system to the client system.

According to another preferred and non-limiting embodiment of the present invention, provided is a computer-implemented method for providing decentralized access to records, the method performed on at least one computer system including at least one processor, the method comprising: generating at least one reference for at least one record stored on a source system, the at least one reference comprising authorization information and a pointer to the at least one record; receiving, at the source system from the client system, a request to retrieve or copy the at least one record from the source system, the request initiated by the client system or a user of the client system using the at least one reference; recording, in at least one data structure at the source system, an association between the at least one reference and at least one of an identifier and a key, wherein the at least one of the identifier and the key uniquely identifies the client system or the user of the client system, such that only at least one of the client system and the user of the client system is permitted to retrieve the at least one record or copy the at least one reference after the association is recorded, wherein the association is recorded before, after, or at the time of receiving the request; determining if the client system or user of the client system is authorized to retrieve the at least one record or copy the at least one reference; and transmitting, from the source system to the client system, at least one of the at least one record and a new reference that points to the at least one record if it is determined that the client system or user of the client system is authorized to retrieve the at least one record or copy the at least one reference.

According to a further preferred and non-limiting embodiment of the present invention, provided is a system for providing decentralized access to records, comprising: at least one source system comprising at least one processor, the at least one source system in communication with at least one data storage device, the at least one source system configured to: generate at least one reference for the at least one record stored on at least one data storage device, the at least one reference comprising authorization information and a pointer to or unique identifier for the at least one record; receive, from a client system, a request to retrieve the at least one record, the request initiated using the at least one reference and including at least a portion of the at least one reference; authenticating or authorizing at least one of the client system and a user of the client system; and transmitting the at least one record to the client system.

According to a further preferred and non-limiting embodiment of the present invention, provided is a system for providing decentralized access to records, comprising: at least one data storage device comprising at least one record, wherein at least a portion of the at least one record is encrypted; at least one source system comprising at least one processor, the at least one source system in communication with the at least one data storage device, the at least one source system configured to: generate at least one reference for the at least one record stored on the at least one data storage device, the at least one reference comprising: (i) at least one of a pointer to a key and a unique identifier of the key, wherein the key is adapted to decrypt the at least one record, and (ii) at least one of a pointer to the at least one record and an identifier of the at least one record; receive, from a client system, a request to retrieve at least one of the key adapted to decrypt the at least one record or a data structure containing at least one of the key or an identifier of the key adapted to decrypt the at least one record, the request initiated using the at least one reference; transmit, to the client system, the key adapted to decrypt the at least one record or the data structure containing at least one of the key or an identifier of the key adapted to decrypt the at least one record, such that the client system is enabled to retrieve the at least one record from the at least one data storage device and decrypt the at least one record with the key or with the key obtained by the client from a separate service, using the identifier of the key.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

DESCRIPTION OF THE PREFERRED EMBODIMENTS

Figure 1:
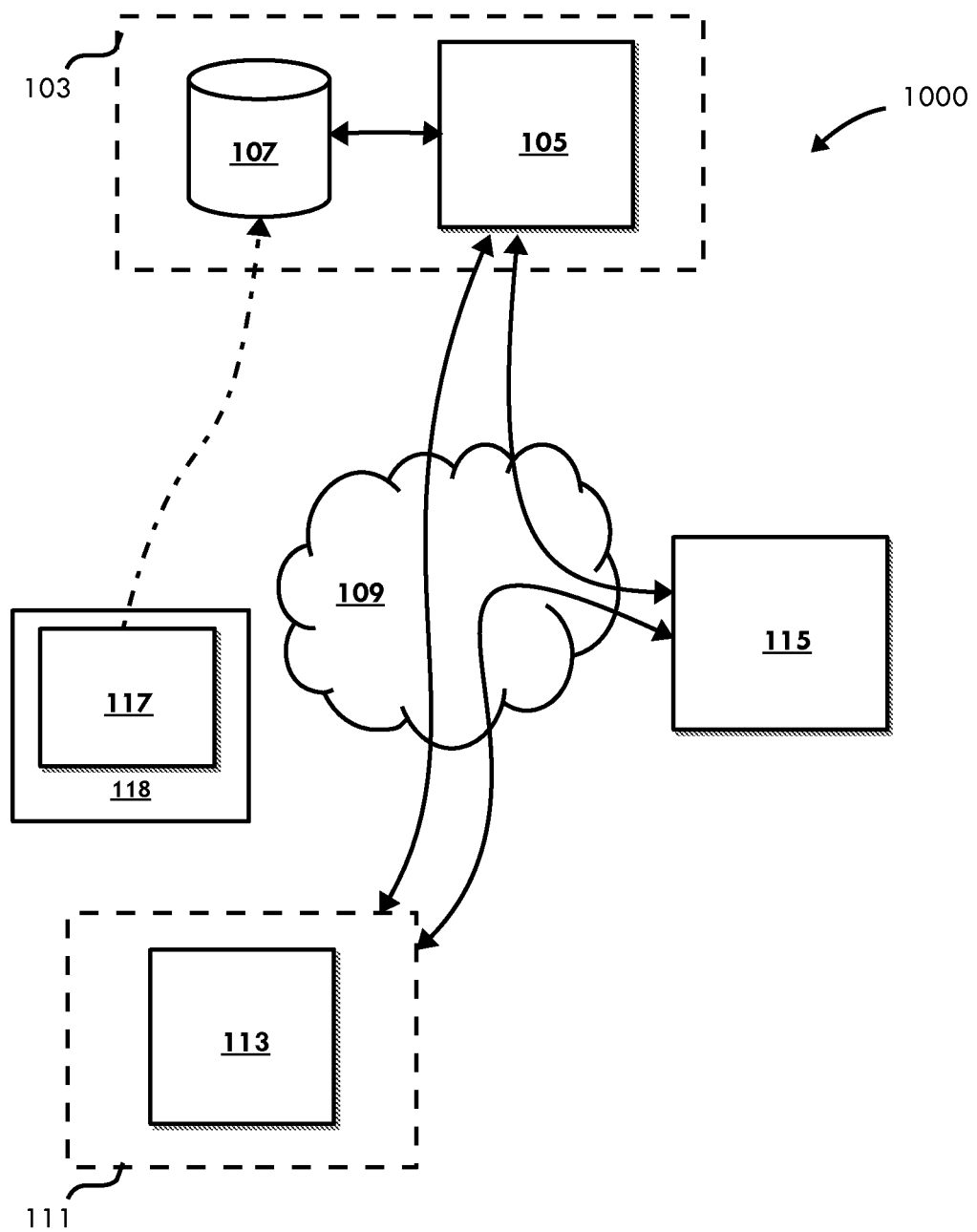
FIG. 1 is a schematic diagram of a system for providing controlled decentralized access to electronic record according to the principles of the present invention.

The following description is provided to enable those skilled in the art to make and use the described embodiments contemplated for carrying out the invention. Various modifications, equivalents, variations, and alternatives, however, will remain readily apparent to those skilled in the art. Any and all such modifications, variations, equivalents, and alternatives are intended to fall within the spirit and scope of the present invention. Further, for purposes of the description hereinafter, the terms "end", "upper", "lower", "right", "left", "vertical", "horizontal", "top", "bottom", "lateral", "longitudinal" and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting. For the purpose of facilitating understanding of the invention, the accompanying drawings and description illustrate preferred embodiments thereof, from which the invention, various embodiments of its structures, construction and method of operation, and many advantages may be understood and appreciated.

As used herein, the terms "communication" and "communicate" refer to the receipt, transmission, or transfer of one or more signals, messages, commands, or other type of data. For one unit or device to be in communication with another unit or device means that the one unit or device is able to receive data from and/or transmit data to the other unit or device. A communication may use a direct or indirect connection, and may be wired and/or wireless in nature. Additionally, two units or devices may be in communication with each other even though the data transmitted may be modified, processed, routed, etc., between the first and second unit or device. It will be appreciated that numerous other arrangements are possible.

In one preferred and non-limiting embodiment of the present invention, provided is a system and method for providing controlled decentralized access to electronic records. In particular, the systems and methods of non-limiting embodiments of the present invention allow for secure and controllable dissemination of electronic records without centralized control. The approach takes the form of a reference, such as but not limited to a URL, formatted character string, and/or the like, which encodes the various protection options that exist in the system and points to at least one record stored in a source system. Additionally, policies may be partially encoded in the reference for governing usage (distribution/copying of the reference, as an example) or security aspects, including whether (orthogonal) protection schemes (such as, but not limited to, public key based authentication or PIN codes) are used to protect the record, as a means for defense in depth. The system of constructing and using references ensures that a particular reference to a record can only be used in certain ways, and also ensures that the way in which references can be copied or passed around in the system can be controlled, depending on the type of record, the patient or doctor's preferences, or other considerations.

Controlling authorization to medical records or other electronic records involves the prevention of unauthorized access, particularly by potentially malicious users or from compromised machines. The system for providing decentralized access to electronic records according to preferred and non-limiting embodiments ensures that access to records is provided in real-world medical situations without resorting to centralized systems with weak and insecure (self-) authorization methods that allow relatively easy access to medical records from basically anywhere, as most current approaches and systems for health information exchange do. Instead, non-limiting embodiments of the system for providing decentralized access to electronic records provides for a way to implement controlled reference distribution/authorization processes where, typically, a human is ultimately in control and is responsible for making an authorization decision, directly or indirectly. Technical approaches for issuing or distributing references automatically or semi-automatically may also be constructed, e.g., for issuing those references as part of a (distributed) medical workflow system that, as an example, locates a care facility for a patient after a patient is discharged from a hospital, or alternatively, where care facilities place bids for patients that they can place. Such systems (if appropriately controlled and secure in itself) can form the basis for implicit authorization mechanisms implemented by non-limiting embodiments of the presently-described system.

Referring now to FIG. 1, a system 1000 for providing controlled decentralized access to electronic records is shown according to a preferred and non-limiting embodiment. A source system 103 may include a server computer 105 and a data storage device 107. The source system 103 may be or comprise part of a medical facility, such as a doctor's office, hospital, or the like. The source system is in communication with a wide-area network 109 or other like network environment, including but not limited to the Internet. Through the network 109, the source system 103 and particularly the server 105 is configured to communicate with a client system 111, including a client computing device 113. The client system 111 may be or comprise part of, for example, another medical facility, an online service for managing access to patient records for patients (such as a "personal health record" or PHR), an online service or portal where, in addition to viewing records, patients can manage authorization to records using mechanisms described herein (e.g., a patient-managed service) or, in some examples, may just include a client computing device 113 being used by an individual outside of a medical facility. The system 1000 may include numerous source systems 103 and client systems 111.

With continued reference to FIG. 1, the data storage device 107 of the source system 103, which may include one or more hard drives or other data storage devices local and/or remote to the server 105, stores one or more electronic records such as, but not limited to, medical records for a patient. In one non-limiting example, the source system 103 may be associated with a patient's doctor or medical professional, such as a general practitioner, although it will be appreciated that there are many other possibilities. The source system 103 may then generate a reference 117 that points to one or more records stored in the data storage device 107. The reference 117 may be used by and/or input into the client computing device 113 at the client system 111 to request retrieval of the record through the server 105 of the source system 103. Moreover, various policies and control mechanisms may be specified or encoded within the references when they are generated, as will be described herein.

In non-limiting embodiments, all functionality of source system 103 as discussed herein may be implemented in a stand-alone secure physical device that is adapted, configured, and/or programmed to implement the functionality for doctors associated with the source system 103, to allow them, via the source system 103 and/or server 105 to: (1) upload records that are to be disclosed to the secure device which are stored there in a secure manner (or which possibly are stored externally, with the secure device securely storing the per-record encryption key instead of the record), (2) generate one or more references to the uploaded records using one or more parameters that describe the policy that applies to these references and records, and (3) provide an interface accessible to external parties (client systems 111) to access these records or to make copies of references they have access to.

Such a non-limiting embodiment, using a stand-alone, secure device, can embed a key or load a key from a secure, tamper-proof device such as a smartcard, and may further consist of hardened software embedded or installed in tamper-resistant or tamper-proof computer hardware in a tamper-proof, tamper-evident and/or tamper-resistant encasement, so that the services and functionality required to implement the current invention can be well secured compared a situation where regular systems used by doctors are directly connected to the (external) network. Such a secure, hardened record and reference management system may also provide key management by implementing a method for key escrow (backup of its secret key(s)), for example using a threshold scheme with which secret keys can be distributed among different peers, who each alone or in a small subset will not be able to reconstruct the secret key, while any larger subset consisting of a predefined number of peers in the full set of participating peers is able to provide the information required to reconstruct the key. It will be appreciated that numerous other possibilities and implementations are conceivable where specific hardware or software is delivered to physicians to (better) manage security of their source systems 103.

Further, in non-limiting embodiments, software in the secure hardware indicated above, or installed at a client system 111, may create a cache of recently-received and not yet expired references 117 such that references to the records of patients that were seen before can be retrieved again in a straightforward manner.

In some non-limiting examples, the reference 117 may be stored on a data carrier or medium 118, such as but not limited to printed indicia, text, and/or barcodes (e.g., one-dimensional or two-dimensional barcodes), smartcards, RFID elements, mobile phones or computing devices, memory storage units, and/or the like. As an example, a matrix (two-dimensional) barcode may include information that initiates a URL redirection system or other like redirection service. Additionally, references 117 may be stored on a reference index 115 or other network-accessible system or service.

Still referring to FIG. 1, the system 1000 in a preferred and non-limiting embodiment may further include a reference index 115 that is in communication with the source system 103 and client system 111. The reference index 115 is configured to store references 117 that point to one or more records in the data storage device 107 of the source system 103. The reference index 115 may include one or more servers, computing devices, interfaces, and/or the like, allowing for the reference index system 115 to manage the dissemination of one or more references, and therefore serve as an authorization hub, discussed further below. Reference indexes 115 may include, but are not limited to, central indexes, regional indexes, institutional indexes, indirect reference indexes or directories, and/or the like. The functionality of reference indexes 115 will be discussed in further detail below.

The source system 103 may include one or more services allowing the source to further manage and control dissimination and use of references to records it holds.

In a preferred and non-limiting embodiment, references 117 may be bound to client systems 111 or users of client systems in one or more data structures at the source system 103. As discussed herein, a client system 111 or user is bound to a reference 117 by association with that reference 117 in one or more data structures. For example, a unique identifier or key, such as a name, public key, PIN, address, and/or the like, may be bound to a reference, ensuring that the client system 111 or user associated with the identifier or key is authorized to retrieve the record and/or to make a copy of the reference 117. References 117 may be bound to client systems 111 or users before or at the time they are used (e.g., when the reference is created, when an operation is invoked with the reference, or during completion of an operation). For example, a pre-bound reference may be bound to a client system 103 or user when the reference 117 is generated. One such scenario may include a doctor referring a patient to a particular specialist and binding an identifier or key of the specialist or associated facility to the reference when it is created. In another scenario, the patient could bind a chosen specialist or facility through an online service, e.g., when copying a reference to send it to that chosen specialist or facility.

As another example, a late-bound reference may be bound to a client system or user after the reference is used. In such examples, the first time that a client system or user attempts to access the record(s) that the reference points to, that client system or user is bound to the reference such that other entities could not then use the reference to access the record(s) or to copy the reference. In both late-binding and pre-binding embodiments, policy options may control whether the reference is copyable or not, in addition to other privileges, authorization levels, and actions that are possible with possession of a particular reference, and possibly also based on additional authorization tokens such as digital certificates that encode properties which are usable for authorization.

In a preferred and non-limiting embodiment, a basic mechanism for copying is to simply copy or transmit a reference without constraints. This can be used for unbindable references. Unbindable references cannot be bound and can be carried by the patient, for example on a USB stick, on a smartcard, or on a smartphone Unbindable references may also be stored in a reference index shared with multiple physicians (for example, in a regional or central index system where pharmacists can easily find references to medication information about a patient stored in the systems of pharmacists in that region). However, without additional protection mechanisms, allowing unconstrained copying as is possible with unbindable references may be associated with risks such as a stolen or leaked reference that may provide access to the record from any location within a potentially large authorized health network.

Therefore, in preferred and non-limiting embodiments, records that are referred to with unbindable/unbound references may be protected using PIN codes (to be typed in every time a record is accessed, for example), reference completion using tokens (only protects the reference until the time that the reference is completed, but not while the completed and therefore usable reference is stored on disk, in a cache, or in some other storage medium), and/or by defining a brief validity period for the reference or by making the reference single-use only. It will be appreciated that various combinations and implementations of these features may be used.

Alternatively, in preferred and non-limiting embodiments, copying can be controlled at the source system if client systems use public key certificates (or other like credentials) that are usable for authentication and to which references can be bound. In particular, a reference issued by a source system may contain policy information specifying that it may be copied. In such an example, as the reference is bound, it may only be copied by its current (bound) holder. Copying is invoked by the current reference holder, and the reference itself is copied by the source system. Because copy operations for bound references are controlled and performed by the source system, all such operations may be logged and tracked. Further, a policy may exist to specify who may make copies to what other parties. This allows the maintainer/owner of the source record to track and potentially control where the authorizations go, in addition to logging access to the record itself at the time that the reference is used.

A copy of a reference may not be identical to the original reference. For example, a copy refers to a record, but may be distinguishable from other references that point to the same record. A copy of a bound reference may contain a new random number or marker so that the copy can be distinguished from the original so as to be bound to another principal user or client system. With a bound and copyable reference, the source system can log and keep track of the path that a bound and copyable reference takes, i.e., of all the copies and their usage, and can potentially impose restrictions and/or policies that control the copying process as well as usage. Unbindable references, in some examples, may be copied and used by anyone. A middle ground may be obtained by issuing single-use references, references that are unbindable but which expire quickly, or late-bound references. As described herein, the source system may implement one or more policies associated with references, including whether to allow copying of references, and whereto copying is allowed.

In preferred and non-limiting embodiments, a public/private key pair associated with the client system or user is used to provide authentication with the source system. For example, the source system may require the client system to respond to a challenge proving that the client system or user is in possession of the private key. The public/private key pair may be generated through use of the RSA algorithm or any other like asymmetrical key schema, and may be implemented in a public key infrastructure using a certificate authority (CA). In addition to being used for authentication, i.e., as a digital certificate or signature, public and private keys may be used to encrypt sensitive information communicated between the client systems and source systems or to generate a symmetric (session) key known only to the communicating parties.

Authorization may be positive or negative. For example, in non-limiting embodiments, authorized client systems or users of client systems may be listed (e.g., a whitelist) in one or more data structures as a client system or user that has authority to retrieve the record associated with a reference or to perform other actions such as, but not limited to, copy a reference. Likewise, client systems and users that are specifically not authorized may be listed (e.g., a blacklist) in one or more data structures. The lists of authorized and/or unauthorized systems or users may be stored at the source system, as an example, and be referenced when a request is received to retrieve a record. A whitelist in this context may also refer to a set of authorized principals or parties, where (membership of) the set of authorized principals or parties is derived, determined, and/or established from some attribute obtained at runtime such as, for example, from a distributed identity management framework or from attributes placed on a certificate signed by a trusted certificate authority. Client systems or users may be listed by name, identifier, key, etc.

In a preferred and non-limiting embodiment of the present invention, multi-layered protection mechanisms ensure protection of private information even in the event that one mechanism fails. For example, in addition to determining whether a client has an appropriate reference and authorization to retrieve or copy a record, or perform another action, a system can additionally check whether the client is a doctor and/or whether access takes place from a known (and trusted and/or authorized) healthcare organization. This provides a second layer of defense in the system. The validity of references can also be used as the sole protection mechanism in certain scenarios (e.g., in a third world country without a public key infrastructure), and in other embodiments, a secret (e.g., PIN code, unique key, etc.) may provide a further layer of protection. Such PIN codes or other secrets may have to be entered every time a record is requested, or in some cases the first time the record is requested. The secret may be known only to a patient and be required before access is possible, although other variations and implementations are possible. As an example, if every client has a unique key, including possibly a self-generated, self-signed key, typing a PIN code or completing a reference (with a part of the reference that was omitted from the reference and which was transferred separately from the reference, e.g., on paper or in human memory) may be required only the first time that the reference is used, as a means to establish trust and to authorize the (late) binding the first time a reference is used. In this context, the token required for reference completion may be seen as an alternative to a PIN because, in the context of trust establishment, it may work just as well as a PIN verification protocol but is simpler to implement since the source system is not involved in checking the secret. Rather, the secret is only used to complete the reference at the client side, to protect the references up to the moment of (late) binding.

In a preferred and non-limiting embodiment, a reference index 115 may include, for example, a central index, regional index, institutional index, indirect index in an indirect record, directory, and/or the like. The reference index may include one or more documents or records for one or more patients, that include references pointing to records. In some examples, a central index may be accessible (publicly or requiring credentials) for physicians, patients, and other parties to obtain references. A publicly available central index may be available for entities that are pre-bound to a reference, while a privately available index may be uniquely created and provided to a physician or other entity to pick-up bound or unbound references. Many other variations are possible. A publicly available central index may also be available for authenticatable but non-bound entities that indicate an emergency, if the index is appropriately configured for that purpose. Indexes may also be provided on a regional level (e.g., by district, town, county, state, etc.), at an institution level (e.g., by facility, healthcare institution, or the like), or grouped by any other commonality. Various other arrangements are possible.

In non-limiting embodiments, the reference index 115 and/or indirect index 120 may be accessible via one or more web pages or other like interfaces. However, it will be appreciated that a reference index 115 may not necessarily be associated with user interfaces and, instead, merely provides references to redirect client systems 111 to another location (such as a source system 103 including a record) or set of locations. The reference index 115 may require additional authorization to log-in or otherwise gain access via any number of protocols. A reference index 115 may also be part of a larger reference management system accessible by the patient and/or other authorized entities.

In some non-limiting embodiments, a reference index 115 may comprise a temporary buffer or other like storage index that stores references until they are picked-up by a user or client system 111. For example, a reference index 115 may include a reference 117 for a specialist physician and, when the specialist physician obtains the reference from the index, the reference may then be automatically deleted or removed from the temporary buffer. This may be used with bound or unbound references. If a reference 117 is pre-bound to a client, that client can then pick-up the reference 117 from the index. If a reference 117 is unbound, that client can then be bound to the reference 117 upon first use after picking it up, or possibly (by the temporary buffer system) at the time it is picked up. In addition to a reference 117 being able to be unbound and picked-up later, some references 117 in non-limiting embodiments are unable to be bound (unbindable) and thus remain unbound despite usage.

An indirect index or indirect record may be reachable through use of one reference 117, and include documents or records containing pointers to other records. Such an indirect reference index or directory may be managed and maintained by the patient, the doctor, or by an independent Trusted Third Party (TTP), where trusted means that the party is trusted by the patient and/or the doctor. In such an example, if references need to be distributed to where they are needed, but the patient, doctor, or TTP may do so conveniently by creating a new indirect index for specific types of doctors, records, or for specific episodes or diseases, and distribute a reference to associated healthcare professionals. In a similar procedure, a case-specific reference index is created that contains only relevant references that may be used by a family doctor when preparing a referral letter, as an example. It is noted that a referral may be printed on paper and accompanied with a disposable magnetic card or other like device containing the (indirect) reference or a part thereof. An indirect reference index or directory of references may be read-only (RO), read-write (RW), or append-only (A), as indicated by a field in the reference (e.g., <permissions>), such that a doctor who sees a referred patient can add a reference to one or more of his or her records to the indirect reference index so that other physicians involved with treating the patient, possibly including the patient's GP, can view this record.

Figure 2:
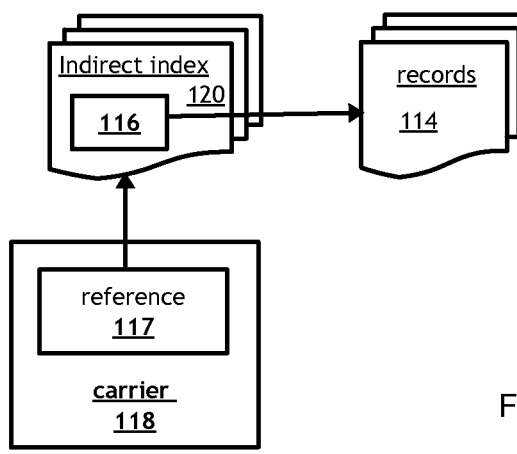
FIG. 2 is a schematic diagram of an indirect index according to the principles of the present invention.

Referring now to FIG. 2, a non-limiting example is shown of an indirect reference. A carrier 118 as described herein, such as but not limited to a USB drive, smartcard, mobile device, magnetic card, printed indicia, and/or the like, includes a reference 117. The reference 117 points to an indirect index 120 that includes one or more references and/or records having references stored therein. A reference 116 in the indirect index or directory 120 points to one or more records 114 stored on a source system.

Another non-limiting example of how an indirect index may be used is where a GP shares a reference to such an index with several other healthcare professionals involved in treatment or care for a patient. For example, specific collaborating health professionals may be involved with the care of a diabetes patient. In this example, each health professional can place a pointer to his or her record on the indirect index so that other healthcare professionals who can access the indirect index can obtain or view it. Of course, father authorization policies associated with the added patient record may be enforced at each corresponding source system, irrespective of whether a client obtained the reference via an indirect index or another way. The indirect reference, in this example, may be created by and stored in the GP's system, and it may be written or appended to by other (authorized, whitelisted) healthcare professionals or healthcare organizations that collaborate with the GP and who have access to an indirect reference that points to it.

In a preferred and non-limiting embodiment, a standardized interface may be provided for adding, reading, removing or updating references and/or entries in an indirect index or directory. The system or service that contains and provides access to the indirect index can, like a source system does for its patient records, log all operations on the indirect index. The "owner" of an indirect index (e.g., the GP, or a patient who created it) can obtain a special reference that allows the owner to view the logging information related to the indirect index. Storage of an indirect index in a GP system is just one possible and non-limiting example. In some non-limiting embodiments, patients may be able to create an indirect index in a service of the patient's choosing, and other variations are possible.

A non-limiting example of a use of the system 1000 can be seen with reference to FIG. 1. The source system 103 may be associated with a GP for a patient. The patient visits the GP and the GP refers the patient to a specialist. In this example, the specialist is associated with the client system 111 which may comprise a computer that the specialist uses. The GP may generate the reference 117 based on the records that the specialist may require, and any policies and/or restrictions that the GP wants to impose. In this example, the GP binds the specialist with the reference 117 by associating, in a data structure, an identifier or key for the specialist (or for the specialist's institution, office, or the like) with the reference 117.

With continued reference to FIG. 1, once the GP generates the reference 117 it may be provided to the patient or transmitted to a reference index 115. If the reference 117 is provided to the patient, it may be encoded or printed on a carrier, as discussed herein, and the patient may bring this reference 117 to the specialist. Since the specialist is bound to the reference 117, the specialist may be the only party authorized to retrieve the records associated with that reference. The specialist then enters the reference (e.g., by entering a URL into a web browser, scanning a barcode, swiping a magnetic card, etc.) and uses it to retrieve the record. If the reference 117 is transmitted to a reference index 115, the specialist may then access the reference index 115 to retrieve the reference 117 and, in turn, the record that the reference points to. In other examples, the specialist may be provided with an indirect reference that points to a reference index 115 and, in particular, a document or record at the reference index 115 that includes one or more references 117 pointing to the record. Various types or reference indexes 115 are described herein.

With continued reference to FIG. 1 and the above-described example, a part of the reference that is being transmitted to the source system 103 to retrieve the record may be omitted from the (printed or stored) reference and carried, transported, or memorized using a different mechanism than the part of the reference that it was removed from. This provides a means for protecting references while they are in transport. In the continuing example, the specialist that obtained the reference may not be able to use it until obtaining the missing portion of the reference from the patient, which the patient may have on a carrier or memorized. As used herein, the term "token" refers to such portions of references that can be used to complete the reference. A token may be used in a system for providing open referrals, where a temporary index system can be used to store the incomplete references at the time a referral is made. The patient can receive a printed referral letter which contains a code (a random number, for example, a 6-digit decimal number) that is required to complete the reference. After the patient selects a specialist and makes an appointment, the specialist can retrieve the incomplete reference from the temporary index (e.g., using metadata such as the patient's name, date of birth or social security number to find the reference), and require the patient to provide the token to complete the reference. After completion, the reference can be bound and used. Until the token is provided (note that the patient may decide not to provide the code until he or she sees the physician in person), the reference remains unusable.

With continued reference to FIG. 1 and the above-described example, the specialist at the client system 111 may want to refer the patient to a second specialist. The specialist's ability to pass on the reference 117 may depend upon policies and/or restrictions on the generated reference at the source system 103 governing the record. For example, the reference 117 may be copyable, in which case the specialist can make a copy of the reference (e.g., create a new and different reference that points to the same record, or create an identical copy of the reference if it is unbindable) which may then be bound to the second specialist (except if unbindable). Additionally, the specialist, after treating the patient and generating records, could itself become a source system for the second specialist, generating a reference that points to its own record for the patient. A specialist can send multiple references, including to its own record, but also (copies of) references to records of other healthcare professionals, onwards to another healthcare professional. Various other examples are possible.

Figure 3A:
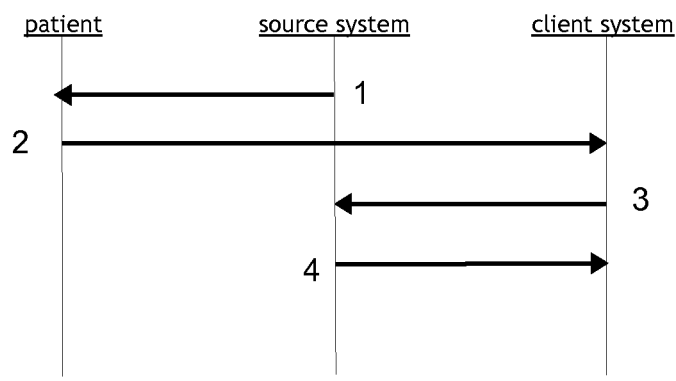
FIGS. 3A and 3B are workflow diagrams for a system for providing controlled decentralized access to electronic record according to the principles of the present invention.
Figure 3B:
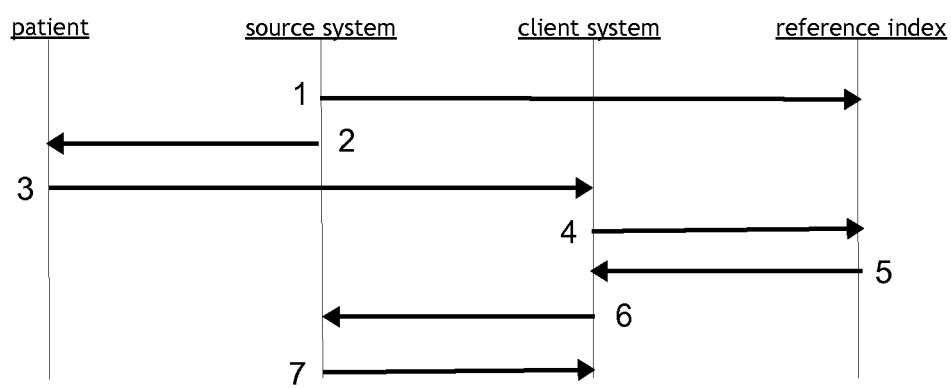

Referring now to FIGS. 3A and 3B, two workflows are shown according to non-limiting embodiments. These workflows depict steps in non-limiting methods and systems, and do not depict every data communication or interaction between parties. In FIG. 3A, at step 1, a source system generates a reference and gives it to the patient, as discussed herein. At step 2, the patient brings the reference to a client system, such as a hospital or specialist computer, where the reference is input into the client system. At step 3, the client system uses the reference to request retrieval of a document from the source system. After authentication and/or authorization takes place, at step 4 the source system transmits the requested record to the client system.

Referring now to FIG. 3B, a workflow is shown with a reference index according to a preferred and non-limiting embodiment. At step 1, a source system generates a reference and uploads it to a reference index. At step 2, the source system provides the patient with access to or information regarding the reference index (e.g., a reference, such as an indirect reference, that points to the index, credentials for the index, a token usable for reference completion, etc.). At step 3, the patient brings this information to the client system which, at step 4, uses this information to access the reference index. At step 5, the reference is retrieved from the reference index and, at step 6, the reference is used by the client system to request a record from the source system. Finally, at step 7, the source system returns the record sought by the client system. It will be appreciated that various other communications and interactions not shown in FIG. 3A or 3B may take place, and that numerous other arrangements are possible.

In one preferred and non-limiting embodiment, the system 1000 can address health information exchange needs across institutions and/or organizations. Authorizations to access records can be coupled to patient workflows and/or they can be generated and issued by patients. Existing physicians of a patient may also actively authorize other physicians or healthcare organizations if needed. This approach for decentralized management of authorization and information disclosure in health networks can be applied such that access is securely organized around the patient. To achieve this, the system may effectively combine directed "push" communication (for "pushing" references/authorizations to specific client systems or users of client systems), with "pull" communication (for obtaining the data after obtaining authorization, using the reference). As explained herein, this reference-based approach can be used in various ways and use various different types of carriers or mediums to store or contain the references.

As an example, references can be pushed within a hospital, from one ward to another and/or from one physician to another. Additionally, references can be passed to another ward in a hospital automatically when a patient is transferred, by passing a reference as part of an intra-hospital patient record or workflow system that may be configured to provide logistics when a patient is transferred from one ward to another. Given that the wards may have separate information systems, or proper security by providing logical separation of different wards, this ensures that, within a hospital, only wards or physicians involved in treating the patient can access the referred-to record(s) or portion thereof about the patient in another ward or other wards from which they obtained the reference or a set of references. A set of references may comprise, for example, multiple records from different wards or healthcare facilities visited before the latest ward by the patient.

The reference may contain a description (e.g., a string of characters) regarding the type of information and record that is referred to. Based on this type information, if information about the requesting physician's role (based on function, specialization, ward, etc.) is available, the source system can make role based access decisions. Based on the same type information, the requesting system can also determine, in most cases before making the request, whether it will or can be successful. The requesting system may also implement additional access control to determine whether a particular employee or doctor may use the reference in question, based on the information that can be observed from the reference. Client systems may be required to check this for reasons of legal compliance to data protection regulations, i.e., to ensure that personnel cannot access (remote) records that the personnel is not allowed to see, such as a gynecologist viewing psychiatric records, or personnel not directly involved with treating the patient.

In non-limiting embodiments in which references are stored on an advanced smartcard or other like device (such as but not limited to a mobile phone or computing device) that is capable of authenticating the terminal or system from which it is accessed, the smartcard may be configured to determine or otherwise control which references may be read or copied off the smartcard by a given healthcare professional or healthcare organization. For example, a pharmacist may only be allowed to obtain references and retrieve associated records relating to medication based information, whereas a general practice doctor or medical specialist may obtain references pointing to medication records as well as references corresponding to a physician's specialization (e.g., references to records of type "GP record" or "oncology record"). Type definitions (e.g., type strings, with corresponding definitions of the possible data, data structuring, or data representation details in the record) and general role-based policies and rules corresponding to those definitions may be made at system design, deployment or usage time, and may differ from system to system and from country to country.

In non-limiting embodiments in which a smartcard or other like device is used as the carrier for transporting references, the references stored on the card can be conditionally protected. For example, references to a record of a particular type—e.g., an emergency record or a basic medication record—may be readable from the card without limitation, while other types of references may be protected using a PIN code or maybe some other type of protection, such as a fingerprint-enabled lock on the smartcard.

Using such a smartcard, controlled transport of references (in a protected data storage space on the smartcard) can be combined with a (decentralized) key management scheme. If the public key of a smartcard that is given to a patient is registered with each system of each healthcare professional or healthcare facility that is visited by the patient, this public key can be subsequently used by these systems to authenticate the patient using his or her public key. In addition, the public key can be used to authenticate a doctor who issues a request to retrieve a record using a reference when he sees the patient: the source may require that the requesting physician has an "authorization statement" containing, for example, the doctor or the doctor's organization's name, or a hash of the doctor's public key, signed using the secret key that is embedded in the patient's smartcard. Such a requirement can be imposed by the source system to authenticate the validity of a request made by a doctor or the system of the organization that the doctor is part of. If such an authorization statement cannot be presented, access will be denied (or alternatively, depending on the system's design and requirements, possibly depending on the type of record, a person at the source or the patient may be signaled to validate or deny the exception, e.g., using an SMS message.) Because the check in this example makes use of the public key that was registered earlier by reading it from the patient's smartcard, the signature over the authorization statement can be verified as belonging to the patient. Authorization statements may be used to authorize a specific employee, a ward, a doctor, or an organization as a whole. The approach of checking authorization statements may be applied in addition to issuing and requiring references, and in some examples may be required for certain references only.

In non-limiting embodiments, the certificate and key of the patient corresponding to the patient's smartcard key, which can be used to verify the signature over the physician's certificate, is part of a certificate chain that can be sent by the client to the source system as part of authenticating to the client, e.g., when setting up a bidirectional authenticated SSL connection to the source system. If leading up to the patient's certificate, where the patient's key was used to sign a certificate certifying the (authorized) doctor's key, this patient-key-signed certificate that is part of the certificate chain effectively comprises an authorization statement. Such a certificate chain may further be accompanied by an optional, separate chain of certificates that composes (at the client side) a delegation structure, or some other structure that implies delegated authority or certification of the signed certificate's identity, attributes, or authority. A delegation structure may be used by, for example, a physician to authorize one of his or her employees (delegation), or to authorize a colleague in a ward that may help in treating the patient. A certificate chain may also, as another non-limiting example, from bottom to top, start with an employee key, signed by a doctor's key, signed by a ward key, signed by a hospital's key, and possibly end with a signature by a health plan or other organization's key. In turn, a patient's key may sign, for example, the hospital key or the key of a ward or a doctor's key for authorization, as explained before, with the decision on what key to sign for authorization being dependent on how a particular system is set up, used, or other practical considerations. Besides using authorization statements, possibly combined with delegation structures in the form of certificate chains, access to valid (bound) references is required for a client system to access a particular patient's records in non-limiting embodiments.

It should be noted that where authentication of clients, doctors, and verification of certificate chains herein is described within the context of setting up (bidirectionally) authenticated SSL connections, other equivalent mechanisms are possible and allowed. The use of SSL is merely given as a representative and practical non-limiting example indicating the use of end-to-end authenticated connections for exchanging requests and replies securely. Another approach is where requests and replies are signed, with the signature accompanied with the signer's public key certificate and possibly the one or more certificate chains(s) associated with the signer's key as described herein, and sent to the source and the client, respectively, as a means to authenticate requests and similarly to authenticate the information that is returned—where, also in this case, relevant certificates and certificate chain(s) may be returned. Likewise, public key cryptography may also be further used to provide integrity protection and confidentiality (by means of encryption) for exchanged request and reply messages or other exchanged information—possibly besides other (cryptography based) security protocols that are usable for purposes of providing confidentiality, integrity and/or authentication in addition to described methods.

In one preferred and non-limiting embodiment, the system enables the passing of references, in a uniform format, from a first location to a second location in a way that is controlled by the patient or the patient's trusted physician. The references point directly to a source system that authenticates the requesting party and that may, additionally, also apply a (general) authorization based on the requestor. Authentication may take place end-to-end. In some contexts, it can be assumed that the requestor (who has access to and can present a valid reference when requesting the record that it points to) has a smartcard that can be used to set up an authenticated, encrypted SSL channel to the source system containing the patient record. Such smartcards are, in some countries, issued to healthcare professionals, and differ from the optional and potentially decentrally issued patient smartcards described above. Health professional smartcards are generally issued by a trusted third party or by the government, and generally contain identity information and, in some examples, attributes of the health professional who owns it. In general, such smartcards are personally owned, and only the health professional has a PIN code to use such a card. In addition, or as an alternative, the system on which the physician works may have a private/public key and a digital certificate matching the public key so that it can be authenticated and, if a suitable certificate authority exists, so that the source system can be identified (e.g., the name of the health organization may be embedded in the system certificate). As described herein, a reference may be bound to any key and, if bound to a healthcare professional, delegation structures and mechanisms may enable delegated personnel to use a reference that is bound to that given healthcare professional.

Clients may also be authenticated at the system level, e.g., using a server certificate that authenticates the organization. An alternative is to have ward-specific keys, or to have doctor-only smartcards, that are used under the doctor's responsibility by all people in a ward. In such non-limiting examples, connections may be made end to end, directly to the source system without involving an intermediate party. The references outlined herein as examples point to the source system directly, although indirect references may also be used that point to an indirect record containing references to source records.

It should be noted that, in some non-limiting embodiments, the client may also connect without having a key. In such embodiments, no encryption may be used or a cryptographic session key shared between client and source system can be generated to protect confidentiality and integrity of exchanged messages, using known protocols which only authenticate the source system. In such cases, binding a reference to the client using a client-side key is not possible, as the client has no permanent and unique key or other unique and permanent credential. In situations where this may occur, unbindable references can be used where PIN protection is used to ensure that a patient authenticates all individual requests.

In some non-limiting embodiments, a client may also have a self-generated public/private key pair with a self-signed certificate that can act as a permanent key to which a reference can be bound. In this case, the client is not identifiable because the certificate contains no identity information. However, using the reference completion (with a token, for example) or PIN based trust establishment methods, the source system can verify that the patient authorized the client that is currently connecting to use the reference, causing the source system to establish a (late) binding.

The controlled dissemination of references is a protection mechanism that is orthogonal to additional authorization schemes such as those based on public key cryptography, but they can well be combined with public key-based authorization schemes explained herein. It will be appreciated that some records may be protected in that a requesting physician must present an authorization certificate created by a patient or by a party authorized by the patient, while other records may be unprotected and retrievable by any physician or healthcare organization (e.g., an emergency record), similar to some references being pre-bound, protected by a PIN code, and/or unreadable from a smartcard without a PIN code, while other references may be read from the smartcard almost instantly.

In non-limiting embodiments, an online service may provide various selectable options and tools for patients and other entities to manage references. For example, if a patient is in the office with a health professional, or at a pharmacist or some other healthcare professional or organization, and wants to access his or her records, the patient can request such access. As a result, a doctor can create an (entry point to) a record on a publically accessible (i.e., via the public Internet) service, and create a reference to that record that can be stored on the smartcard or other carrier—possibly in addition to a reference that is placed there for professional use. Using such a reference, which may be referred to as a "transparency reference", patients may view records from home using a program on their PC, or via an online service—the latter after copying over the transparency reference to the online service (e.g., a patient-managed service or PHR). If a patient has a smartcard or other carrier containing a public key known to the source, the patient may be able to set up a bidirectionally authenticated channel using the key on his smartcard or carrier as a means to be authenticated to see the records pointed to by the transparency references that the patient has access to. This way, end-to-end authentication and confidentiality can be provided for the requested records from the source system to the patient's own machine, using the bidirectionally authenticated and encrypted connection. When using a PHR, the patient's smartcard may be used in another way to authenticate to the source system(s) where the record(s) are requested from. Alternatively, unidirectionally authenticated connections may be made from the patient's system to the source, in which case only the source system is authenticated. In such cases, if the patient does not have a smartcard or key to be authenticated with by the source, patients may be requested to enter an earlier-chosen PIN code that was registered at the source, when they want to access a record. In these non-limiting examples, patient authentication and, in most if not all cases, confidentiality can be provided when a patient accesses the requested records from the source system.

In non-limiting embodiments, a patient-managed service (acting as a PHR) can allow for records to be viewed using transparency references, but it may also be usable as a way for patients to distribute references to health professionals or health facilities. Using a particular non-limiting configuration of the system, a patient-managed service may allow for the patient to create copies of copyable references and bind these copies to a particular health professional or facility. Also, patient-managed services may allow patients to view meta-data (e.g., logging and other analytical data associated with a record), using special references that point to this meta-data.

In non-limiting embodiments, references that can be made accessible to or via a patient (via a smartcard, or by uploading them through an online portal, as examples) can have one or more of at least three functions: (1) Regular references intended for retrieving records for professional use by physicians. These references may or may not be accessible from regular computers on the Internet, and they may or may not be accessible by physicians from computers in healthcare organizations. These references may also be copyable-only, in which case they can be used to create a copy of such a reference for a specific healthcare professional or organization, and may be bound to an authorization hub and/or a patient-managed service that can act as an authorization hub, but which cannot use the reference to view the record itself. (2) To allow the patient to view the record directly (e.g., transparency references); and (3) To view metadata pertaining to the record that is maintained in the source system, such as logging data (accessible to the "owners" of the information in a record, including the doctor who generated the record and the patient). A specific "metadata" reference type can be used which points to metadata that is stored at the source system. Although, in some non-limiting embodiments, the above-described reference uses may not be combined in a single reference, a source system may pass multiple references to a patient (portal) at once (e.g., send three references, one for each of the three functions, to the patient portal in a single message, or store references of all three types on the patient's smartcard at once). Various other implementations are possible. Transparency references may or may not have identical form and functionality compared to regular references, which includes having properties such as but not limited to copyability, permissions, bindability, etc. encoded in them. However, content and type of the referred-to record may differ, even for equally typed references: orthogonal RBAC or other authorization policies may be applied to the requesting client or patient, which may result in different content for the record being returned for an otherwise similar reference.

Placing references to patient-accessible records on a smartcard or other like device that may also contain a cryptographic key pair registered in the physician's system ensures that the patient can be authenticated by the service when the patient requests records from home, or when the patient logs into the online system and uses a reference. In other cases, transparency references that allow for viewing records can be pre-bound to a particular online service before they are sent there or given to a patient, such that the records pointed to can only be retrieved by and viewed through this service. In these two non-limiting examples, the patient may be provided with an overview of all or part of the information stored in a given source system. The patient may be properly authenticated when the public key of the patient is known to the healthcare professionals/organizations that were visited by the patient and that read the patient's smartcard public key off the smartcard while copying the reference stored to it. Moreover, in non-limiting embodiments in which patients have centrally-issued smartcards backed by a PKI (such as but not limited to a government-backed PKI), patients may be authenticated and identified by services and by the source system as a basis for authorization without being required to register their smartcard public key decentrally with every visited healthcare professional first.

Having technology control authorization in a generic, automated way may give rise to less secure situations than when humans control authorization explicitly. Humans can also make errors, but it is harder to hold technology accountable for bad authorization decisions than humans. Given that trust is fundamental to healthcare, having (trusted) healthcare professionals guard access to data and, if needed, make decisions at their discretion (e.g., in emergency situations) is important. An algorithmic or generic approach to access control (e.g., using a course-grained role-based access control scheme) can not likely replace an explicit, human decision, and may not adjust well to exceptions to the rule if the need arises. In one preferred and non-limiting embodiment of the present invention, the system for controlling decentralized access to records makes active, explicit, responsible and discretionary access control possible, by explicitly authorizing healthcare professionals or organizations by passing references to them. Furthermore, patients can have a role in passing references explicitly to physicians who treat them, thus allowing the creation of a flexible network of access around the patient.

In non-limiting embodiments, a reference functions as a precise description of where a record is to be found, and as an authorization token. A reference also encodes or embodies information on the type of record that it refers to, and on the way that the reference may be used (e.g., policies regarding whether the reference may be copied or not, as an example). A reference may be, but is not limited to, a URL. Other structures may be used to encode aspects of security protocols and authorization procedures that are associated with the record, the reference, and its usage. By encoding properties in a reference that can be parsed at the client side, client systems are facilitated in deciding what they can and cannot do with a reference in advance of making, for example, an attempt to retrieve a record using a reference or to make a copy of a reference.

In one preferred and non-limiting embodiment, a patient or other type of user can specify a PIN code at the source system at the time that the reference is created. Thus, when the record is accessed, the PIN must be typed in. In some examples, the PIN need not be used every time the record is accessed, as would be the normal way to use PIN protection, but only the first time to bind the reference to the requesting health professional or health organization, as discussed herein. This approach ensures that late binding takes place securely, such that authorization to use (and bind) the late-bound reference is controlled by the patient. Reference completion using a token has a similar function. Requiring an authorization certificate may be another way to avoid misuse of (unbound or late bound) references. The context in which the system is deployed may influence the use of references. For example, in one area or situation, issuing smartcards with keys to patients may be a preferable solution to using PINs. In another country, key management may be much more difficult, and PIN codes may be the preferred means to protect a record, possibly in combination with late binding if the requesting physicians or health organizations are expected to be in possession of a cryptographic key to authenticate/identify itself.

In one non-limiting embodiment, references carried by a patient or stored in a reference index system may be identified as copyable while not being usable to retrieve a record. In this example, the policy allows for the reference to be copied, but not to access the record. As an example of how to use unbound, copyable references on a smartcard, a patient at a phaimacist may have a smartcard or other carrier with a reference. The pharmacist reads one or more copy-only references from the smartcard, and uses them to make a bound copy of the references. Next, the copy-only reference can be removed from the pharmacist's system, and only the copied, bound reference is kept. This avoids any risk that a later attacker covertly copies a copyable unbound reference from the pharmacist's system and uses them from another system, while providing the advantage of allowing the pharmacist to copy the reference at a later time if the source system is temporarily offline. As an alternative, a copy-only reference may be bound to an online patient-managed service, or to a patient's smartcard key. With the latter example, the patient smartcard can run an application that can set up an end-to-end bidirectionally authenticated connection, or which can send authenticated (signed) requests to the source system (the smartcard can be PIN protected), using the smartcard's authentication key and certificate (which may correspond to the public key that was registered as described hererin). Next, the (bound) smartcard can invoke an operation on the source system's interface to create a (bound) copy of the reference for the pharmacist, that the pharmacist's system can subsequently obtain from the smartcard, after which it can be used by the pharmacist to request access.

In non-limiting embodiments, the reference may encode several parameters: the location where the record can be found; the identifier/name of the record to which the reference points to, and/or its type; and/or a token, PIN or other extra authorization components embedded in the reference that make the reference difficult to guess for an attacker. The reference may also encode information regarding whether the reference is bound to a user or client system. The reference may also include encoded information regarding policies, such as whether the reference is copyable. In some non-limiting examples, a portion of a reference, such as a token, must be assembled with the remainder of the reference at the client system before requesting the records.

In preferred and non-limiting embodiments, the system may include an authorization hub that can be used to create new copies of references and forward them to authorized health professionals or health organizations in an emergency or other situation. By having access to an authorization hub or taking the role of an authorization hub, a trusted party (e.g., a family member or healthcare professional) can take care or authorization when a patient cannot. As an example, a physician may work night shifts in a healthcare facility called a GP post where doctors are available at nights and in weekends. This GP post may be authorized by having (sets of) references of patients registered there, as an example. The GP post and its doctors may act as or use an authorization hub when the regular GP of the registered patients is not available. This scenario may be health specific, but it will be appreciated that it may be applicable to other scenarios where active, explicit authorization to access records may be needed, and where an authorization hub can be convenient as an access point for requesting authorization to particular records. For example, this scenario may be implemented in military, industrial, police, or other contexts. Authorization hubs may comprise one or more servers in communication with the Internet or other network that can be accessed by authorized parties wishing to create new references (as copies of references that the authorization hub has access to), and/or manage existing authorizations.

The authorization hub, in a preferred and non-limiting embodiment, involves a delegation of permission to explicitly authorize others for access at the delegatee's discretion. The source system can (on behalf of the patient whom the record concerns) implement a policy on whether to allow copying of references, and whereto, which may be used in addition to the authorization hub's discretionary authorization of other parties.

As a non-limiting example of how an authorization hub may be used, suppose a GP has a record containing data relevant in an emergency. The GP also has a reference pointing to a record of a pharmacist that contains medication information, some of which may be relevant in an emergency. The pharmacist authorized the GP at some earlier time by passing a reference to the medication information to the GP. If the GP gets a telephone call from an emergency ward concerning the patient, and if the patient permitted this (which may be reflected in an internal policy kept by the GP), the GP can authorize the emergency ward by sending a reference pointing to its emergency record to that ward. The ward can then look into the GP's emergency record. The GP may also, if authorized (as reflected in its internal policy and/or in the pharmacist's policy), make a copy of the reference to the pharmacist's record and send it to the emergency ward. This may be done by invoking a method on the pharmacist's (web) service that returns a new copy of the original GP's reference, after which the new reference can be sent onwards to the emergency ward, so the emergency ward can then view and check the patient's medication record. If the copied reference is late bound, the reference may be bound to the emergency ward when this ward first accesses the record, but in this example the copy of the reference may be pre-bound to the emergency ward by the GP. However, if the GP does not have enough information about the emergency ward's key if, for example, the GP is under time constraints, late binding may be convenient. If the reference is first obtained by a physician who uses a personal public/private key pair (e.g., on the physician's official smartcard), then this physician may be bound to the record instead of the full emergency ward. Alternatively, as stated, the GP may also specify the target doctor or ward a priori when it creates a copy of the reference. The next day, the pharmacist may determine that a copy to one of its patient's records was made and sent (bound) to an emergency ward, by viewing the local logfiles. If needed, the pharmacist could then call the GP, the ward, or even the patient or the patient's family, to check if there really was an emergency and what the current status is.

A second example, extending on the above example, is where a GP post (which represents the GP in after-hour situations) is authorized by the GP to obtain the patient's emergency records and/or the physician record for out-of-hours care. In this case, authorization takes place in a chain extending the previous example. For the pharmacy records, authorization went from pharmacist to GP, from GP to GP post, and eventually from GP post (acting as an authorization hub) to a next entity. In the example case of an emergency, the GP post can authorize an emergency ward by forwarding a copy of the reference pointing to the GP's emergency record and a copy of the reference pointing to the pharmacy record to the emergency ward, which can then access these records. In this case, when explicit copies of the reference are made, the GP and/or the pharmacists can later verify that the GP post authorized the emergency ward, and inquire whether this authorization was legitimate. Furthermore, the references may be sent to a given ward explicitly over a secure connection (e.g., using a secure email system, SSL, and/or other like secure protocols) so that the authorizing party knows that the reference ends up at the right location and not in the computer of an untrusted party. This makes responsible, accountable reference passing and authorization possible.

In a non-limiting embodiment, records or portions of records may be encrypted. This may apply to the source system 103 which can store records in storage system 107 in encrypted form, or which can store encrypted records in an external system, while keeping the key(s) to encrypt or decrypt the records secret; such encryption can take place transparently, i.e., not visible, from the point of view of the user of the system or a client. Another non-limiting example is where the client generates an encryption key and encrypts for a record (possibly each time that a new reference or a copy of a reference is generated, so as to have a separate encryption/decryption key per reference), before storing it in an (untrusted) external storage system. This approach allows the source system to store the encrypted records in a possibly untrusted, external infrastructure, such as the cloud, thus, for example, limiting the storage requirements at the source system 103. In this example, the client has to decrypt the encrypted record after obtaining it. For this to work, the source, instead of providing the client with a record, must provide authorized clients (where authorization implies the same checks that take place when clients access regular records using a reference) with a key with which the client can decrypt the encrypted record. Also, the source must provide information to the client on how it can find and retrieve the encrypted record; this information is provided by the source system together with the decryption key, or it is placed in the reference. Thus, in a situation where a health record is stored in an encrypted form in an external system, a reference effectively points to the key that is needed to decrypt the encrypted record, in addition to containing information or allowing the client to obtain information, with which the client can obtain, decrypt, and if necessary reconstruct the encrypted record.

As an alternative embodiment, a reference may point directly to the encrypted data, while the reference contains the key or an identifier of the key (such as a hash of the key). The most likely scenario, however, is that the reference points to a key that is stored in the trusted (by the doctor and the patient) source system 103. The key itself may or may not be additionally protected with a PIN, passphrase, or similar secret that may be kept in the patient's memory, or in some other location.

In non-limiting embodiments where the reference points to and allows for retrieval of the decryption key (from the source system that the reference points to), the reference also contains a pointer or an identifier that allows the client to retrieve the encrypted records, or possibly several encrypted data blocks or files that together compose the record after decryption. As discussed herein, a reference or a pointer to encrypted information may in fact point to a record or a data structure which in turn contains information that allows decryption, and if necessary reconstruction of the record that the reference relates to. For example, in a non-limiting embodiment, the client returns not just a decryption key, but embeds this key in a data structure that also contains pointers to encrypted data blocks that are stored in a global storage system. This data structure may contain a set of hashes of encrypted data blocks of which the encrypted record is composed, with a signature (created using the key of the creator of the encrypted record) over a "table of contents" that lists all (hashes of) data blocks. Thus, instead of pointing to a key, a reference may point to a special type of record which contains pointer(s) to encrypted data (blocks) besides to the decryption key or an identifier of that key—this provides all the information needed to find the encrypted data records and decrypt them, and reconstruct the record from the resulting decrypted information, if needed. Finally, in all cases, it may be possible that the source system returns an identifier instead of a key, which allows the client to retrieve the key from a separate service, managed externally or possibly by the source. In all cases, before the key or encrypted records (or encrypted data blocks) may be retrieved, the source or the service that contains the key (or the encrypted records, data blocks, or other data that is required to decrypt and reconstruct the record), may separately or additionally authenticate and authorize the client, just as a source system may apply orthogonal authorization mechanisms in addition to verifying that the client has a valid reference.

The above non-limiting examples are indicative of some approaches to manage access to encrypted records where the references are used to manage access to keys. There may be many application domains in which secure key management by means of and through a form of reference management as described herein is useful, including in military and police applications, for example.

There are many possible ways for encrypting records or making changes to encrypted records. For example, in some non-limiting embodiments, a record could be encrypted once, where all references that point to this record contain a (pointer to, or identifier naming) the same decryption key. In another, more secure example, a new encryption key is generated for each new reference, and possibly (but not necessarily) even for every copy of a reference. This approach makes it possible to make the record unreadable to a client once its reference becomes invalid (e.g., when the client becomes blacklisted or when the reference times out and is not renewed), by removing the encrypted data blocks (but not the encrypted data blocks that are associated with another reference), which may be impossible to guarantee if many clients (each having a different reference) share the same decryption key. With bound references, associating separate encrypted data and encryption/decryption keys with each unique (bound) reference, implies that each bound party uses a different key. This makes it possible to revoke keys and encrypted data per reference, and also to prevent any new changes made to a record to find their way to the encrypted, externally stored version of the record that is associated with a reference if that reference is invalidated. This provides confidentiality (of updates to records), in the sense that clients holding invalidated references cannot see updates to the record—even in cases where removing records from external storage is difficult or impossible, or when clients illegally retain earlier-obtained decryption keys.

In all cases, the source system is responsible for creating the encryption/decryption key(s) (encryption and decryption keys may be different—as with asymmetric keys—or equal—as with symmetric keys) for encrypting the record, and for, placing it in external storage, if required. For updating an encrypted file or record, it may be that, instead of re-encrypting the full record, a new encrypted data block or set of blocks can be created that, for example, contains all changes to the original (encrypted) record(s), and which is encrypted with the same encryption key as the original block. A data structure associated with the record can contain information that allows finding all constituent parts of the encrypted record, so that the original encrypted record, in combination with the encrypted data which contains the changes to the record, can be used by the client to construct the (updated) version of the record after decrypting all encrypted data blocks. The latter example makes clear why it is sometimes necessary for the reference to point to (or for the source to provide) a data structure that in turn contains pointers to several encrypted data blocks or data structures, instead of pointing directly to an encrypted record or file. Some of such intricacies of managing encrypted files may be implemented by the encrypted storage system instead of by the source system. It will be appreciated that non-limiting embodiments of the present invention can work with several encryption/decryption or data storage schemes, as long as the reference can somehow, directly or indirectly, refer to decryption keys and encrypted data corresponding to a reference and record.

As described herein, references may contain information about the privacy, usage and security policies associated with the reference, such as for example the above policy on (late) binding a reference to a given client. Another example is information on whether the reference may be copied Embedding this information in the reference makes it self-contained—i.e., the user or client system can determine the type of document is that the reference is referring to and any associated policies and/or restrictions. The reference may also encode whether certain security protocols are required for using the reference, such as a PIN code exchange, a public/private key authentication, and/or the like. In one example, the PIN phase may not be used every time but only upon first access. In this example, the PIN may be used to establish the validity of the binding of the reference to a given client. In this example, the PIN would be a condition before binding of the reference is allowed, but after binding it could be used freely without requiring the PIN. Other example scenarios that use references may never use the PIN verification protocol, simplifying implementation—in these non-limiting embodiments, client systems that are not equipped to handle PIN verification and that occasionally receive a reference that specifies PIN protection may report an error or ignore the reference.

In one preferred and non-limiting embodiment, the system serves as health communication building block which can help as part of larger health organization solutions. For example, an important aspect of a complete health communication organization may be that health information sent back to a trusted intermediary such as a family doctor, who can keep an overview of the patient's health, but can also help out in making decisions about disclosing information to other health professionals, including what the most suitable way is for such disclosure. A trusted pharmacist who maintains information may also be important. In such cases, references to health information may be sent (automatically or, in some cases, after patient consent) to a family doctor or trusted pharmacist or another, trusted party or service indicated by the patient (e.g., a PHR/patient-managed service).

A benefit that non-limiting embodiments of the present invention provides is that clients that receive a reference can always obtain the most recent version of this record. In push-based systems, by comparison, a physician sends the current version of its record, but may not send updates to the target physician, or may send them too late, so that at the time a patient is sitting with the target physician, that physician is working from out-dated information. As an example, sending a reference may be part of communicating information back to a GP after discharge from a hospital. In current practice, a discharge letter is often only sent to the GP after a period of time, when the discharging doctor or one of his assistants has had time to write a letter to the GP. With regard to sending back references, an initially incomplete letter (clearly indicating incomplete status), can be created in the discharging doctor's system, and a reference to that letter can be sent back to the GP instantly. This incomplete letter may not yet contain the whole story or letter describing the discharge, but it may already contain information about, for example, prescribed medication at discharge time which otherwise may be sent to the GP only weeks later once all the information for the discharge letter is complete.

In a preferred and non-limiting embodiment, references can fit in a fixed-size field of characters. Space for sending references along with other information can be pre-allocated in emails, push messages, healthcare information system data structures, in workflow engines, or in other data structures without using much bandwidth or storage space.

In preferred and non-limiting embodiments, references have an expiration date or time. For this reason, but also potentially for liability reasons, physicians may make copies of information obtained through a reference. The expiration date or time may make references temporary, and active only as long as needed (e.g., half a year or a year, depending on when the patient is expected to be discharged from the hospital, etc.). Another expiration date that reference may contain is a maximum time before a late bound reference must be bound. If for example a copy of a reference is made in an emergency, a late bound reference with a short binding expiry can be created, since if the reference is bound and used the next day, the emergency is likely over; this helps prevent misuse of such an unbound reference at a later time. Further, in some embodiments, references may be renewable. A renewable reference may be similar to a copyable reference described herein, but may be used in different situations. For example, if a renewal request is made before the original reference is expired, the holder of the original reference can renew its 'lease' on the record. Various policies and/or restrictions may be applied.

Non-limiting embodiments of the present invention may be implemented in combination with existing systems such as, for example, CCD/CCR-supporting IHE health information exchange systems designed and used in the USA, including but not limited to systems that implement health information exchange of radiological images, or HL7(-CDA, -v2, -v3, . . . ), and/or European ISO/CEN-based documents. Thus, these non-limiting embodiments may be adapted to or contain records that use specific standards for representing medical information, and (re)use existing security or key management mechanisms, and/or the like. Another example of an existing system in which the current invention may be used, is DirectProject, which is based on a secure (authenticated and encrypted) mail system that uses existing S/MIME protocols. Instead of pushing messages to healthcare professionals as is done in current systems that use DirectProject, references can be pushed within the email messages that are sent using DirectProject protocols. This allows for creating flexible networks of access around a patient and the patient's records. Such an approach, where a decentralized "pull system" is constructed by embedding references in push messages, can limit the need for the (regional) reference index systems that are currently often used in for example IHE-based setups, also in the US, where the boundaries of regions are either likely to become too inflexible when patients move to healthcare facilities in different regions, or where it turns out that the pull system becomes so large, with so many attached client systems that can retrieve records, that security is very hard to maintain or guarantee.

In one preferred and non-limiting embodiment, references may contain a timeout (or a time to live, expiry date); this is relevant so that decentralized 'caches' (indices) containing references can be cleaned up automatically and easily (garbage collection). Possibly, the patient and/or his or her (general) physician can construct a 'master' reference index—which in case of a patient may be resident on a smartcard, or possibly in a Personal Health Record (PHR)—that may or may not be complete. The time to live may differ per record, depending on the information there (e.g., relatively non-sensitive emergency data may be long-lived), or per scenario or doctor (references given to a patient or family doctor or references in a master index may be long-lived; references given to a hospital short-lived).

In some non-limiting implementations, a patient may not want every doctor to have a complete overview of his or her medical history, and may not even want to have a record of certain episodes. In such cases, references or sets of references may provide incomplete medical histories and, in some examples, a patient can destroy references on his or her own smartcard, device, or index, or prevent addition of references to it, creating a partial reference index that prevents certain references from distribution.

In preferred and non-limiting embodiments, orthogonal public key based authentication and authorization mechanisms may be implemented. Physicians may digitally sign requests that are sent over to a source system using a digital signature or similar mechanism, such that the request can be logged. If possible, a PKI or a decentralized system for creating patient smartcards can be very usable to ensure that physicians can be authorized by the patient in a way that is verifiable at the source (where the patient's public key may be pre-bound). When employees access patient records on a doctor's behalf, they may do so using a private key too, such that the doctor or other authorized individual can create a delegation certificate for that employee that indicates the delegated authorization. Using such approaches, a full authorization chain can be implemented using a certificate chain.

In non-limiting embodiments, a delegation/certificate chain may consist of various parties—one example may be where a patient delegates her son to authorize a physician who authorizes an employee to access the record, and who then authorizes another doctor who in turn authorizes another employee. The certificate chain may in fact consist of disparate (but overlapping) certificate chains, for example the chain in which the patient delegated authority to her son, and another chain where the doctor delegated authority to an employee. However, these disparate but overlapping chains can conceivably be verified to 'add up' from bottom (second doctor's employee) to top (initial patient authorization), if these certificate chains and the certificates of all parties involved are sent along with a request to retrieve a record.

In preferred and non-limiting embodiments, the client and source systems are capable of establishing a secure, authenticated cryptographically protected (SSL) connection. The client may be a system with a system certificate (such as, but not limited to, one issued by the government specifically to healthcare organizations), or an individual (e.g., a doctor with a government-issued smartcard, as available in Germany, Austria or Holland). The https protocol may be reused for end-to-end confidentiality of the requests and replies if the https server is able to authenticate and/or authorize the client.

In a preferred and non-limiting embodiment, and as described herein, a reference may be in the form of a URL. However, although the use of ASCII-oriented URLs (without whitespace) is convenient, the structure, form, and/or implementation of references described herein is merely exemplary. The following is a URL schema according to one preferred and non-limiting embodiment. As used in the following example, < >=mandatory field; [ ]=optional field; |=or; and : and /=field separator. It will be appreciated that any number of fields of various types may be used. Further, the following discussion on URL/reference structure is purely exemplary and non-limiting. It will be appreciated that various other approaches and implementations may be used.

As an example:

```
<network>:<transport>://<domainname[:port]>/<RPCtype>/
[RPCdatarepresentation]/<datatype>/<contenttype>/<contentsubtype>/
<patientID>/<recordID>/<indirect-link=[y|n]>/<PIN=
[y|n|trust-binding]>/<token>/<bind=[y|n]>/[bind-expiry]/
<expiry>/<allow_copy=[y|n]>/<allow-renew=[y|n]>/
<permissions=[r|w|a]>/[encryption-options]/[extensions]
```

Ordering and separation characters (e.g., '/', ';', ',', etc.) may be important in some non-limiting embodiments. The reference is generated by the source, and will or may be stored internally in a table there, associated with a data structure which contains the 'pre-parsed' string and possibly additional information, associated with the reference, such as the hash of the public key of a party bound to the reference, as discussed herein. In some non-limiting embodiments, the reference passed with a request must match the original string exactly. This avoids parsing at the source side—only a look-up on existence of the reference is required. This is an advantage over on-the-fly parsing of incoming references, which is a common cause of security vulnerabilities of (web) services. By checking on the existence of a reference, the source system can check whether the reference was indeed generated by it. The information in the reference may be (partially) parsed at the client side, so the client can find information about the record type and information about, for example, the security protocols or properties associated with a given reference.

The <network> field may be used to denote a particular network. For example, a 'care specific' (LP) network may exist in a country, or a regional network that is used as the basis for a regional information exchange system. A network between hospitals and (family) doctors or clinics may have a separate IP-range and separate DNS servers from the public Internet. Public references that point to web services or web pages on the public Internet, which contain records which were made accessible to patients on their request, may also exist. The public Internet may be indicated using the network indicator "Inet", as an example. A Dutch care specific IP network may be indicated as 'Znet-NL'—another example may be 'artsennet'. Interpretation of this field is application dependent, but certain names such as Inet will be standardized by convention.

The <transport> field may specify a data transport protocol such as, for example, https:// (meaning HTTP over SSL/TLS over TCP/IP). As another fictional example, httpz:// could indicate a particular secure web server variant where the server may, in contrast to standard https, allow for bidirectional authentication using self-generated keys with self-signed certificates; such a scheme may allow for a non-standard naming convention using domain names (computer names) that, for example, contain the hash of a system's public key in base32 encoding, that allow for authentication of the server's key using the server's name. Using the transport field, the client knows, among other possibilities, what domain naming scheme to expect, and how to configure, for example, its connection parameters before connecting to a source system.

The <domainname:port> field specifies the domain name/TCP port combination where the server (the source system) is reachable over the network. For example, if the transport is https://, the server may need to prove it has access to a key corresponding to a certificate which is issued by a trusted PKI/CA that authenticates the domain name. Alternatives or possible extra semantics for the <domainname[:port]> field could be documented for, and depending on, a given <transport> identifier.

The <RPCtype> field may indicate a type of Remote Procedure Call (RPC) mechanism that is to be used for retrieving records and/or for invoking an operation on a server-side (source side) interface—e.g., to retrieve a record or to create a copy of a reference. Although a basic (default) interface for provinding read-only access to records in a source system may be implemented using a REST-style approach (simply using a primitive like http GET to retrieve a record over a https connection, using a reference), other RPC mechanisms—and payload encodings associated with those—may be used in a particular source-side implementation. The particular RPC mechanism used is indicated in the RPCtype field, so that the client (combined with knowledge on network, transport and domainname/port), knows how to invoke an operation on the source system. Non-limiting examples of RPC mechanisms are, for example, XML-RPC, SunRPC, or SOAP. If not clear from the RPCtype, the optional [RPCdatarepresentation] field may contain or be combined with a data-encoding description, such as XML or XDR or JSON. The most likely data type that is returned by an RPC operation is simply a document that contains the patient record referred to, or a document containing the copy of the reference, or a set of references in an indirect record; in this case, [RPCdatarepresentation] information is not needed. RPCtype encodes such aspects that specify a particular RPC interaction in sufficient detail to select a suitable implementation.

The <datatype> field may include data types or parameters specific to data encoding or data representation systems and formats that are used for medical information, such as Edifact (a Dutch EDI dialect), HL7v3, HL7-CDA, or other types of data. This, in combination with a <contenttype> field, may represent the requested record. The <contenttype> field indicates a particular type of message which is encoded using <datatype>. Examples may include the WDH-v2 or EMD-v3 medical information "message types", as (Dutch) examples of a GP record and a pharmacy (medication) record, respectively. Some references may have a special data or content type, for example indirect references may, for example, have a contenttype "indirect-index-v1" which, combined with a data type that indicates an indirect record, may describe the way in which an indirect index in an indirect reference is encoded. (The encoding of references in an indirect index may evolve over time, hence the version number). The <contentsubtype> field may include serial numbers or it may be used for other (future) purposes.

The <datatype>, <contenttype>, and <contentsubtype> fields can, if needed, be grouped within a specific syntactic marker (e.g., { } symbols) to signal a grouping of types that belong together (a "field group"). A sequential list of field groups can be included in a reference with a logical OR ("|") marker between each field group. This syntactic construct allows for client-side selection of a given data/content representation (e.g., EDI) and content type (e.g., WDH-v2), in cases where the server (source system) supports retrieval of a given record in different representations. The field grouping/OR mechanism prevents that multiple references must be passed around for essentially the same information, where each only differs in the content/data representation that the data is shipped in. However note that internally (in the source system), multiple separate (not multiplexed) references may still have to be constructed, using which the reference with field groups are constructed and using which each references that comes in with a request can be separately verified upon receipt.

A reference that contains field groups is not directly usable by a client: field groups are a syntactic construct that allows a source system to, essentially, multiplex multiple references (to the same record, but each with a different content/data representation) within a single 'virtual reference', that can be passed to client systems. From the groupings in the virtual reference, one can be selected by the client system as a representation that it can parse/interpret, after which it can construct a valid reference using which it can obtain the information in the chosen content/data representation. Only <datatype><contenttype><contentsubtype> fields may be grouped/selected using field group selection; other fields are identical for the underlying references; if other fields (e.g., expiry, or copyability properties) differ, a different reference needs to be created and passed around: the references are then simply different ones. The way in which the client has to select from the OR fields or field groups and in which a valid reference can be constructed from this information should be precisely defined in a programmer manual.

The <patientID> field may include patient identifiers. In Holland, all citizens have a unique identification number (corresponding to the Dutch Social Security Number) that is also used in healthcare to identify patients, but PatientID may be any type of identifier, since not every country uses an SSN or has it mandated as a patient identifier. Some hospitals use their own, self-assigned patient identifiers, which could be included here (the number is interpreted, and thus can be understandable at the source). Furthermore, SSN's may not be unique, not even in a country. For disposable cards or otherwise, it may be useful to omit this number and to have it be filled in at the client side after the doctor identified the patient. This helps security/privacy if the card is lost—a reference is then truly anonymous. Alternatively, if privacy is a requirement, a source system can generate a pseudonym for the patient to be included in the reference, using a source-side translation table to translate pseudonyms back to real PatientIDs if needed. As non-limiting examples, thus, SSNs may be used, care or caregroup specific numbers may be used, health organization specific numbers may be used, and pseudonyms may be used as patient identifiers,—depending on requirements and legal constraints. It will be appreciated that any number of identifiers may be utilized.

The <recordID> (or documentID) field specifies the document. This field could be a random number and may correspond to a specific record (or a specific sub record or extracted part of the record). Per patient and per source, multiple documents may exist, and multiple document/recordIDs may be generated. RecordIDs may also be (file) names.

With anonymous links in particular, the name of the document should not contain patient-identifiable information or information about the disease. In a preferred and non-limiting embodiment, <recordID> should be an opaque, random number.

The <Indirect-link=y|n> (indirect link) field indicates whether the reference points to a dossier directly or to an indirect link. An indirect link points to an "indirect record" that contains an indirect index, i.e., a set of references to other records, normally of a single patient, in some data encoding. As described herein, the indirect index may include references that, in turn, point to other indirect records. Indirect references, as discussed herein, may be used when, for example, the carrier is a magnetic card and has limited space. In such a situation, a doctor or other source can prepare an indirect reference pointing to an indirect index that contains one or more references which the client system can request after reading the references from the indirect record that contains the indirect index. Besides convenience, indirect references may provide privacy, similar to redirecting a link on the web, by obscuring real references that may include and reveal sensitive information, such as which healthcare professionals are seen by a patient. Additionally, the indirect reference and/or directory may be writeable (or appendable) such that physicians or others who come into contact with the patient can add references pointint to their own records to the indirect index.

Distributing (copies of) indirect references to multiple healthcare professionals directly involved with treating a patient can be very convenient for diseases or conditions where multiple physicians and other healthcare professionals are involved with treating a patient, such as in diabetes care. The set of healthcare professionals in the group that can access a given indirect record can be straightforwardedly extended by one of the existing holders of the indirect reference, who can copy his or her indirect reference for the new member of the group, who, upon receipt of the reference, is authorized to access the indirect index and the patient's information (if possible additional authorization methods such as RBAC do not raise an exception when the new member tries to use the reference).

In some non-limiting embodiments, indirect links, <contenttype> and <contentsubtype> fields may be left empty, since an indirect index may contain links to several document types (e.g., GP summary, or medication overview).

The <PIN=y|n|trust-binding> field may indicate whether the patient added an (extra) PIN code to the record. The PIN is not contained in the link, as it is a secret, but it can be filled in with a separate cryptographic handshake protocol, as an example, that takes place between a patient (at the client side) and the source system. The source system associates the PIN or an encrypted variant thereof with the reference using an internal data structure, so that it can be validated at the time that a client uses the reference. PINs can add security, and can present an alternative to situations where patients have a smartcard to authorize healthcare professionals. PINs are optional and, in some non-limiting examples, may be used only for highly sensitive records. For emergency cases (where a patient may be unconscious), having a PIN may be inconvenient—however in such cases there may be other ways to get at the patient's data, e.g., by calling a family member, a GP, or a GP post.

The PIN=trust-binding option is used to indicate that the PIN is only needed the first time that a reference is used, when a (late) binding is established. In this case, a PIN will be only used once, the first time that a reference is used, and typing the PIN can be a prerequisite for registering/binding the client to the record the first time. Note that, in this case, reference completion using a token may also be used,— omitting the need for implementing a PIN validation protocol. It should however be noted that in contrast to a PIN, a token can no longer be considered fully secret once it is typed in and the reference is completed with it—in contrast to a PIN which is validated using, for example, a challenge-response protocol between client/patient and source system and which is not stored anywhere except possibly at the source system (potentially in encrypted form). After a token is included in the reference to complete it, it may be stored on disk and it may even be known and visible to healthcare professionals using it, as part of the references. Different variations are possible.

The methods for trust establishment described herein may also be usable in the context of credit card security, as a means for trust establishment using a CSC code, or in other contexts. Furthermore, even for references which are created as unbindable (using <bind=n>), the source system may still obtain and persistently store information about the clients who connect, including as IP ranges or possible keys, the first time that a reference is used, if such information is available. Although not official bindings, a trust establishment method such as PIN verification may be applied in different scenarios and use cases where a given client is as yet unknown to the source system, and where certain security or audit checks are omitted once trust is established in a given client or system. This particular way of using trust establishment is not necessarily applied in all embodiments. To the contrary, many other implementations are possible.

The <token> field is in a newly generated (copy of a) reference. It may have the following two non-exclusive functions, as examples:

a) a means to 'randomize' the URL—e.g., to distinguish one copy of a reference from the other (necessary for binding)—and to make it hard to guess.

b) to be (partially or completely) removed from the reference by the system or person that requested creation of the reference or the copy of a reference, before distributing the reference further, so that the token can be transported separately from the remainder of the reference. This provides protection of references while they are not completed (e.g., during transport), since incomplete references are invalid and cannot be bound or used. The token (or a part thereof) may be carried by the patient. It may be, for example, printed on a piece of paper, separate from the remainder of the reference. In one preferred and non-limiting embodiment, the token must be filled into the link before the reference is complete and usable.

Splitting a reference up into parts or portions can be useful in several instances. One approach is where there is a service containing the incomplete references, which can be retrieved when a physician plans to see the patient. Before the record can be retrieved, the physician can make a call to the patient who may then read out the number over the phone. This acts as an authorization of the physician by the patient. The system or the person that requested creation of the reference (copy) may specify the token as an argument to the method for creating the reference, if it is necessary for the patient to specify, select, or remember the token easily. A token (a number) may be memorized, it can be passed to the patient or to a physician by mail, by phone, or on paper, or in some other way.

The difference between a token (separated from a reference for reference completion) and a PIN code is that a PIN code is always secret and never visible in plain text to anyone but the patient; a PIN is not exchanged or stored in plain text elsewhere other than, possibly, at the source. However, the token may be exchanged and stored as part of a reference, or as part of a message or carrier that is transported separately from the reference). A token may be viewed as a 'temporary PIN', but it will be appreciated that a token stored on disk in a physician's local reference index (cache) differs from a PIN.

The <bind=y|n> field determines whether each (copy of a) link is unique and can be uniquely bound to a (separate) requesting party. Binding implements a defense in depth approach by ensuring that theft of a reference is useless, unless if the bound doctor's or organization/system's secret key is also stolen. (A system key, for example, may be physically stored on a tamper-proof, difficult to steal and hard to compromise device such as a PIN-protected smartcard, which may possibly additionally be loaded into a computer that is locked in a secure room, in a particular example). Binding also ensures that all operations on references (such as onward authorization/copying) remain accountable, to an extent, and thus can be traced to the user or the system that is bound to each reference. Binding may not be usable in some cases, for example when clients do not have unique authentication credentials (such as keys) to which references can be bound.

The optional [bind-expiry] field indicates the time when a late bound reference may be bound at the latest. A short bind expiry may be useful for, for example, references that are copied in an emergency and passed to an emergency room. If the reference is not bound within, say, a few hours or a day, it may be assumed that the reference can be safely invalidated—limiting the chance of later misuse of this reference. It should be noted that different ways of indicating the expiry time or date can be conceived. If left empty, a bind-expiry is not applied or not applicable.

The <expiry> field represents the time at which the link will be invalidated. It is useful also for the client to know this so that it can apply garbage collection. Furthermore, possible renewal should be done before expiration.

Because links may expire, doctors could make copies of any relevant retrieved information in their own records. This is not out of the ordinary—physicians are often responsible for keeping their records complete and correct, so including information about consulted information with their own records is often necessary. The link can be stored alongside the copied information so that the system can automatically verify whether the original information has been updated since it was viewed before, in a type of caching system. If expired links are kept at the source and destination, it may help settle issues that may arise around records that were viewed earlier and changed in the meantime. A doctor can always request, in person, a new reference to a record with the original doctor. Electronic renewal may also be possible, but this may only take place if the original link was valid (see below with <allow-renew>).

The <allow-renew=y|n> field indicates whether electronic renewal is possible. As indicated in the 'scenarios' document, renewal operations should preferably be viewed at the source, in person, by the source record holder. Normally, a reference should not be needed after <expiry>; the expiration period should correspond to normal treatment periods, such as year or half a year. Verifying renewals (or possibly even vetting them before creating a new reference) at the source can be an important manual check.

The <allow-renew> field indicates whether renewal is allowed. Renewal is similar to copying, except that copies are intended for other parties (subject to policy on whether the reference may be copied or not), while renewed references are intended and accessible only to the party that has (and is bound to) the original reference. The policies associated with renewal may be less stringent than with copying, as copying means that authorization is passed to another healthcare professional or organization. Furthermore, copying may be instant while renewal may be delayed by vetting. Other than that, the operations are quite similar.

The <allow-copy=y|n> field indicates whether copying is allowed. If set to 'n', copying is never allowed, however this may be verifiable only when the reference is bound. Unbound (unbindable) references can be copied over without constraint, as the source system cannot tell who is allowed to hold the reference (although intelligent 'audit log checking' mechanisms may be applied to try to detect strange patterns and throw exceptions in that case, possibly based on, for example IP addresses from which references were used. Specific analysis may be applied to clients in some cases, particularly if trust in a given client cannot be established, or if strange usage patterns occur with certain references.

Copying of bound, copyable references takes place at the source, using an operation provided by the (web service) interface which also allows retrieval of the record. Only the current (bound) reference holder can copy a reference. Copying is logged and (at least periodically) presented to the record holder/doctor at the source. Copying creates a new reference, which points to the same record as the original one.

Late versus prior binding will be discussed according to one preferred and non-limiting embodiment. Late binding is binding at first use, and prior binding occurs at the time of creating/copying a reference. It remains to be seen whether late binding is something which needs to be encoded (as a property) in the URL; currently, we view aThis may be a property stored in a data structure with the source record where the reference is kept, but this may change. Other variations are possible.

As described herein, PIN codes can be used to confirm validity of a late binding, on first access. In this example, a PIN code is only used once, to validate a late binding on first use, after which the reference can be freely used like a regular (bound) reference. A specific encoding to indicate that a reference requires such a late-binding-PIN is "PIN=trust-binding".

The <permissions> field gives an indication of what the client may do with the record or indirect reference. Combinations of R (for Readable), W (for Writable) and A (for Appendable) are possible. The combination RW and RA access are primarily useful for indirect references (so that health professionals can add references to their records to the indirect index). It may be possible for a client to modify a source record, although Appending may be possible at some time. This may be useful for patient access in some cases, for example. Changing or appending records may in some cases result in an internal copy of the record with changes clearly distinguishable, where the changes may have to be vetted by the record holder before they become visible to others. However, most records are probably read-only, meaning that only the owner of the record—the person who created the record at the source—can modify the record.

For non-owners of a record, a possible way to 'modify' or 'change' (e.g., add to) a record from a functional point of view, is to make a copy of that record, mark it as a copy, change it, create a new reference to that record and, as an example, place that new reference in a reference index or indirect index with other references for the patient so that the record can be found and read as an update of the original record by a client accessing that index in the future.

In one non-limiting example, there may be an <extensions> field. Several (future) extensions to the options discussed herein can be encoded in the extensions field. An example is a <revocation-list> field, which may specify the address of a revocation list, for dynamic invalidation of references (in addition to the <expiry> field). A similar field may also be useful to revoke decentrally issued patient smartcards or point to other revocation (blacklist) information.

Another example of an extension is a <target-requestor> field that may bind a link a-piori to a particular doctor or organization key, where the first use of the reference should be done by this requestor for security reasons. The (late) binding which is then established may in fact be to a key of that doctor's choosing, such as a ward key (after deciding on the ward that the patient has to go to), or possibly a colleague's key. Here, the initial (target) requestor must be the first to use the reference, and is responsible for deciding what key to bind to the reference. Various refinements to security may be conceived that may thus be encoded in the extension field of a reference, the above being a non-limiting example. Creation and modification times for the record, references to a record of which the current record is a copy, or other metadata, are other non-limiting examples of information that may be encoded in an <extensions> field.

In one preferred and non-limiting embodiment, encryption-related fields/extensions may be provided in the field [crypto-options].

It is conceivable that a record that a reference points to may be encrypted. This may be the case if a record (a medical record, but possibly other types of records) is stored in an external infrastructure, such as a cloud. Related to this, a reference may contain fields such as: <Encrypted=y> [Key=XXX] (where XXX can be an identifier for the key, e.g., a SHA-1 or SHA-256 hash of the public key) <PasswordProtected=y> [Password=<password>], and [data-reference] (where data reference can be a direct reference to the encrypted data or to a data structure that can be used to locate all the encrypted data needed to decrypt the record, e.g., an URL, or an identifier of the encrypted data using which it can be found using some external data storage system).

There are many different possibilities. For example, the decryption key (or password to decrypt the decryption key) may be included in the reference (note that the password itself may not be sent to the server, as the server or cloud should probably not be able to decrypt the data: the password is used at the client side to decrypt the key which is next used to decrypt the encrypted data), but the reference may also simply state that the encryption key is protected, where it must be assumed that the patient has (e.g., knows, carries) a passphrase to unlock the encryption key.

As outlined herein the reference may point to a key, in which case the reference management system presented herein is essentially turned in a key management system, turning the mechanisms that are used to control dissemination and usage of references to records into mechanisms that are used to control dissemination and usage of references to keys. In this case, the <data reference=XXX> field is present to allow the client to find the encrypted record or the encrypted data blocks in some public or private external data storage system, depending on where the encrypted data is stored by the source. Finally, as outlined in earlier paragraphs, the reference could point to a record that contains information to find and retrieve one or both of the decryption key and the encrypted records, which may reside on different physical locations or servers in some cases. Many variations are possible.

Embedding encryption-related fields in the reference allows for increased flexibility of usage in certain scenarios. For healthcare, direct access of records at the source may be preferred, as this allows access to the most up to date information directly from the system of the health professional which is responsible for the content of the record. However, the health professional's system may not be able to serve large record (e.g., radiological scans) efficiently, in which case using external storage to serve (encrypted) files can provide a solution. In addition, external storage may be able to offer better availability guarantees, assuming that client systems retain the decryption key with the records they obtained earlier; updates can then be retrieved from the external storage system without necessarily requiring involvement of the source system at the time of retrieval. Client system 103, although possibly owned by a health professional or health organization, may be externally hosted under the healthcare professional or health organization's responsibility, which may in some cases also provide a solution to availability and reliability concerns; in that case, however, unencrypted records or decryption keys may be available to the external hosting party, whereas in the situation where the health professional manages keys directly, possibly within a secure subsystem of source system 103, this problem (which may cause privacy concerns) can be alleviated.

Example link: artsennet:https://hap-assen-noord.nl/XML-RPC//Edifact/HWD-v2/0/186012316/randfilnam01/Indirect-link=n/PIN=n/ksnve93329ilknm0874en7rv/bind=y//11-5-2012/permissions=R/

The present invention may be implemented on a variety of computing devices and systems, wherein these computing devices include the appropriate processing mechanisms and computer-readable media for storing and executing computer-readable instructions, such as programming instructions, code, and the like. This computing system environment may include, but is not limited to, at least one computer having certain components for appropriate operation, execution of code, and creation and communication of data. For example, the computer includes a processing unit (typically referred to as a central processing unit or CPU) that serves to execute computer-based instructions received in the appropriate data form and format. Further, this processing unit may be in the form of multiple processors executing code in series, in parallel, or in any other manner for appropriate implementation of the computer-based instructions.

In order to facilitate appropriate data communication and processing information between the various components of the computer, a system bus is utilized. The system bus may be any of several types of bus structures, including a memory bus or memory controller, a peripheral bus, or a local bus using any of a variety of bus architectures. In particular, the system bus facilitates data and information communication between the various components (whether internal or external to the computer) through a variety of interfaces, as discussed hereinafter.

Figure 4:
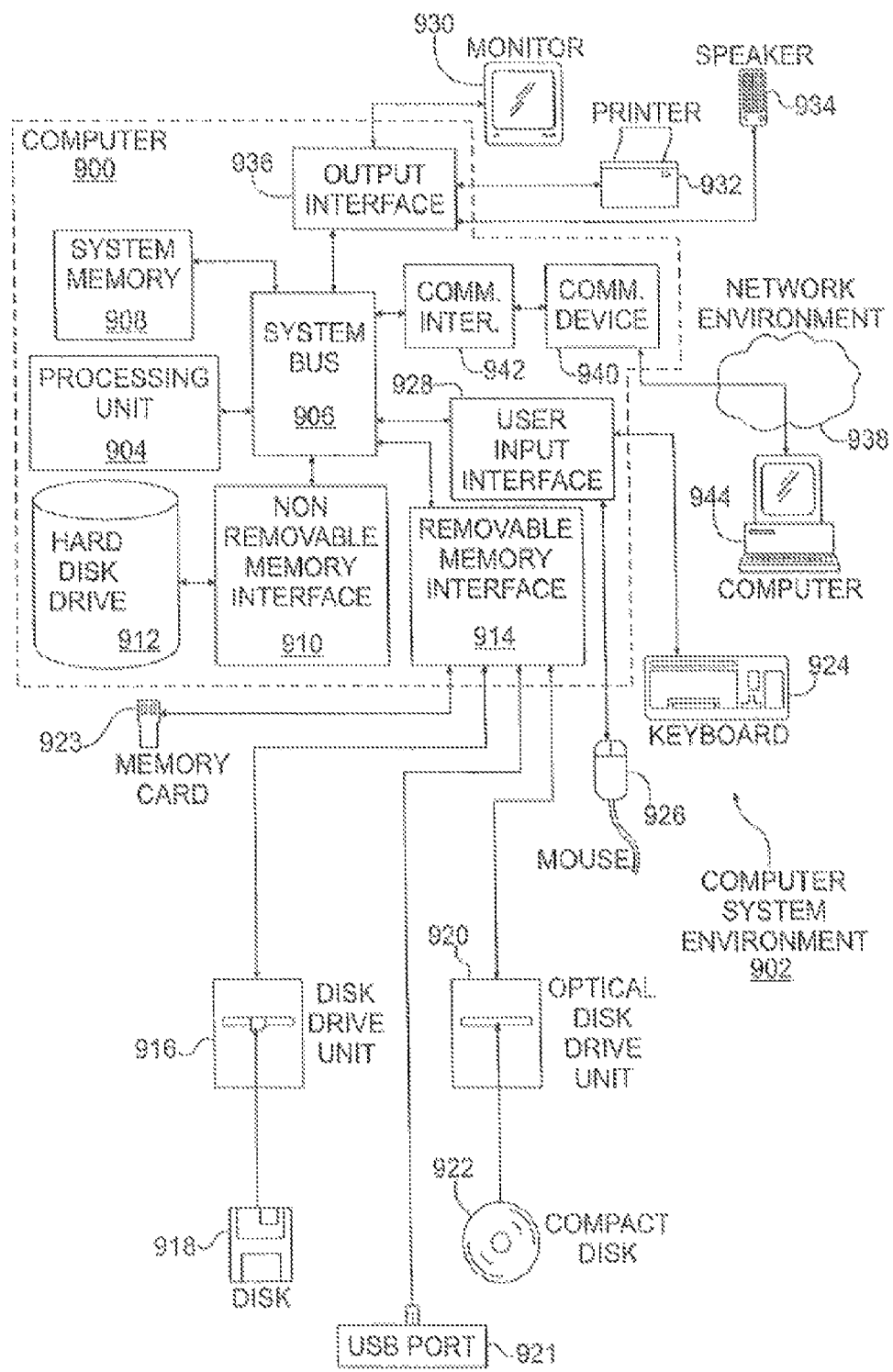
FIG. 4 is a schematic diagram of a computing environment according to the prior art.

Referring to FIG. 4, the computer 900 may include a variety of discrete computer-readable media components. For example, this computer-readable media may include any media that can be accessed by the computer, such as volatile media, non-volatile media, removable media, non-removable media, etc. As a further example, this computer-readable media may include computer storage media, such as media implemented in any method or technology for storage of information, such as computer-readable instructions, data structures, program modules, or other data, random access memory (RAM), read only memory (ROM), electrically erasable programmable read only memory (EEPROM), flash memory, or other memory technology, CD-ROM, digital versatile disks (DVDs), or other optical disk storage, magnetic cassettes, magnetic tape, magnetic disk storage, or other magnetic storage devices, or any other medium which can be used to store the desired information and which can be accessed by the computer. Further, this computer-readable media may include communications media, such as computer-readable instructions, data structures, program modules, or other data in other transport mechanisms and include any information delivery media, wired media (such as a wired network and a direct-wired connection), and wireless media. Computer-readable media may include all machine-readable media with the sole exception of transitory, propagating signals. Of course, combinations of any of the above should also be included within the scope of computer-readable media.

A user may enter commands, information, and data into the computer 900 through certain attachable or operable input devices, such as a keyboard 924, a mouse 926, etc., via a user input interface 928. Of course, a variety of such input devices may be utilized, e.g., a microphone, a trackball, a joystick, a touchpad, a touch-screen, a scanner, etc., including any arrangement that facilitates the input of data, and information to the computer 900 from an outside source. Devices may also include, for example, readers for smart-cards and/or magnetic cards, and PIN entering devices. As discussed, these and other input devices are often connected to the processing unit 904 through the user input interface 928 coupled to the system bus 906, but may be connected by other interface and bus structures, such as a parallel port, game port, or a universal serial bus (USB). Still further, data and information can be presented or provided to a user in an intelligible form or format through certain output devices, such as a monitor 930 (to visually display this information and data in electronic form), a printer 932 (to physically display this information and data in print form), a speaker 934 (to audibly present this information and data in audible form), etc. All of these devices are in communication with the computer 900 through an output interface 936 coupled to the system bus 906. It is envisioned that any such peripheral output devices be used to provide information and data to the user.

The computer 900 may operate in a network environment 938 through the use of a communications device 940, which is integral to the computer or remote therefrom. This communications device 940 is operable by and in communication to the other components of the computer 900 through a communications interface 942. Using such an arrangement, the computer 900 may connect with or otherwise communicate with one or more remote computers, such as a remote computer 944, which may be a personal computer, a server, a router, a network personal computer, a peer device, or other common network nodes, and typically includes many or all of the components described above in connection with the computer 900. Using appropriate communication devices 940, e.g., a modem, a network interface or adapter, etc., the computer 900 may operate within and communication through a local area network (LAN) and a wide area network (WAN), but may also include other networks such as a virtual private network (VPN), an office network, an enterprise network, an intranet, the Internet, etc. It will be appreciated that the network connections shown are exemplary and other means of establishing a communications link between the computers 900, 944 may be used.

As used herein, the computer 900 includes or is operable to execute appropriate custom-designed or conventional software to perform and implement the processing steps of the method and system of the present invention, thereby, forming a specialized and particular computing system. Accordingly, the presently-invented method and system may include one or more computers 900 or similar computing devices having a computer-readable storage medium capable of storing computer-readable program code or instructions that cause the processing unit 904 to execute, configure or otherwise implement the methods, processes, and transformational data manipulations discussed hereinafter in connection with the present invention. Still further, the computer 900 may be in the form of a personal computer, a personal digital assistant, a portable computer, a laptop, a palmtop, a mobile device, a mobile telephone, a smartphone, a server, or any other type of computing device having the necessary processing hardware to appropriately process data to effectively implement the presently-invented computer-implemented method and system.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof. Further, although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A computer-implemented method for providing decentralized access to records, the method performed on at least one computer system including at least one processor, the method comprising:

generating, with at least one processor, at least one reference for at least one record stored on a source system, the at least one reference comprising a URL, the URL including a pointer to the at least one record, type information associated with the at least one record, and policy information that identifies permissible actions that can be performed on the at least one reference;

binding, in at least one data structure at the source system, the at least one reference and at least one of a client system and a user of the client system, such that only the at least one of the client system and the user of the client system is permitted to invoke the permissible actions on the at least one reference, wherein the binding of the reference and the at least one of the client system and the user of the client system is recorded in the at least one data structure at the source system;

receiving, at the source system, a request to retrieve a copy of the at least one reference from the source system, wherein the copy of the at least one reference is at least one new and unique reference including policy information and a pointer to the at least one record, the request initiated by the at least one of the client system and the user of the client system using the at least one reference;

authenticating the at least one of the client system and the user of the client system using at least one of the following: a key, a passphrase, a password, a secret, a PIN, or any combination thereof; and transmitting the copy of the at least one reference from the source system to the client system after determining that the at least one of the client system and the user of the client system is authorized to copy the at least one reference.

2. The computer-implemented method of claim 1, wherein the at least one reference is generated at a first medical facility, and wherein the client system comprises at least one of the following: a second medical facility, a patient portal, a workflow management system, or any combination thereof.

3. The computer-implemented method of claim 1, further comprising assigning, by the source system, at least one of an authorization level and a role based at least partially on data received from the client system and a policy registered in the source system.

4. The computer-implemented method of claim 1, further comprising tracking, in a data structure at the source system, entities that are bound to the reference and entities that access the at least one record with the at least one reference.

5. The computer-implemented method of claim 1, wherein at least a portion of the at least one reference comprises a token, wherein a portion of the at least one reference must be completed with the token at the client system to authenticate the at least one of the client system and the user of the client system, and wherein the token is a random number generated by the source system.

6. The computer-implemented method of claim 1, wherein at least a portion of the at least one reference comprises an identifier, the identifier comprising at least one of a national citizen identifier, a social security number, a patient identifier, and a globally or locally unique identifier generated by the source system.

7. The computer-implemented method of claim 6, wherein a remaining portion of the at least one reference must be completed with the identifier at the client system.

8. The computer-implemented method of claim 1, wherein the at least one reference comprises at least one indirect reference, such that the at least one reference indirectly points to the at least one record by pointing to at least one other record, the at least one other record comprising at least one other reference pointing to the at least one record.

9. The computer-implemented method of claim 1, further comprising storing the at least one reference on a portable data storage device or printed medium.

10. The computer-implemented method of claim 1, further comprising storing the at least one reference on a network-accessible service.

11. The computer-implemented method of claim 1, further comprising providing an online or offline system configured to facilitate a patient to transmit the at least one reference or any of a set of one or more copies of the at least one reference to a healthcare professional or to approve the healthcare professional as an authorized recipient of the at least one reference or a copy of the at least one reference.

12. The computer-implemented method of claim 1, further comprising storing the at least one reference in an indirect record that comprises a plurality of references pointing to a plurality of other records comprising the at least one record, wherein an indirect reference comprises a pointer to the indirect record.

13. The computer-implemented method of claim 12, wherein the indirect reference comprises a URL and is at least one of the following: printed on a tangible data carrier, stored on a data storage device, stored on a network-accessible service, stored on a printed medium, encoded as a one-dimensional barcode, encoded as a two-dimensional barcode, or any combination thereof.

14. The computer-implemented method of claim 1, further comprising:
storing the at least one reference in a temporary index; and
automatically deleting the at least one reference from the temporary index after the client system or the user of the client system has retrieved or obtained the at least one reference.

15. The computer-implemented method of claim 1, wherein the at least one reference further comprises an expiration date after which the at least one reference cannot be used to retrieve the at least one record or copy the at least one reference.

16. The computer-implemented method of claim 1, wherein the source system authenticates the at least one of the client system and the user of the client system based at least partially by determining if the user of the client system is in possession of the at least one reference and a private key corresponding to the at least one of the client system and the user of the client system, the private key associated with a public key.

17. The computer-implemented method of claim 16, wherein the private key is stored on at least one of a smartcard and a portable device, and wherein a binding between the at least one reference and the public key associated with the private key is recorded in the at least one data structure.

18. The computer-implemented method of claim 1, wherein the at least one reference and the at least one of the client system and the user of the client system are bound only if the at least one of the client system and the user of the client system establishes that it possesses a secret corresponding to the at least one reference, wherein at least a portion of the secret or information derived therefrom is stored by the source system when the at least one reference is generated.

19. The computer-implemented method of claim 1, wherein the binding of the reference and the at least one of the client system and the user of the client system is recorded in the at least one data structure at the source system when the at least one reference is generated, when a copy of the at least one reference is generated, when the at least one reference or the copy of the at least one reference is initially used, or between a time that the at least one reference or the copy is generated and a time that the at least one reference or the copy is initially used.

20. A computer-implemented method for providing decentralized access to records, the method performed on at least one computer system including at least one processor, the method comprising:
generating, with at least one processor, at least one reference for at least one record stored on a source system, the at least one reference comprising a URL, the URL including a pointer to the at least one record, type information associated with the at least one record, and policy information that identifies permissible actions that can be performed on the reference;
binding, in at least one data structure at the source system, the at least one reference and at least one of a client system and a user of the client system, such that only the at least one of the client system and the user of the client system is permitted to perform at least one action of the permissible actions on the at least one record on the source system, the at least one action comprising at least one of the following: retrieve the at least one record from the source system, append information to the at least one record, overwrite at least a portion of the at least one record, delete at least a portion of the at least one record, copy the at least one reference, or any combination thereof;
authenticating at least one of the client system and the user of the client system using at least one of the following: a key, a passphrase, a password, a secret, a PIN, or any combination thereof; and
after authenticating the at least one of the client system and the user of the client system, permitting the at least one of the client system and the user of the client system to perform the at least one action on the at least one record.

21. The computer-implemented method of claim 20, wherein the at least one reference is generated at a first medical facility, and wherein the client system comprises a second medical facility or a patient portal.

22. The computer-implemented method of claim 20, wherein at least a portion of the at least one reference comprises a token, wherein a remaining portion of the at least one reference must be completed with the token at the client system at the time of authentication, and wherein the token is a random number generated by the source system.

23. The computer-implemented method of claim 20, wherein at least a portion of the at least one reference comprises an identifier, the identifier comprising at least one of a national citizen identifier, a social security number, a patient identifier, and a temporary or persistent unique identifier generated by the source system, and wherein a remaining portion of the at least one reference must be completed with the identifier at the client system.

24. The computer-implemented method of claim 20, wherein the at least one reference comprises at least one indirect reference, such that the at least one reference indirectly points to the at least one record by pointing to at least one other record, the at least one other record comprising at least one other reference pointing to the at least one record.

25. The computer-implemented method of claim 20, wherein the at least one reference further comprises an expiration date after which the at least one reference cannot be used to retrieve the at least one record or copy the at least one reference.

26. A computer program product for providing decentralized access to records, comprising at least one non-transitory computer-readable medium including program instructions that, when executed by at least one computer system, cause the at least one computer system to:
   generate at least one reference for at least one record stored on a source system, the at least one reference comprising a URL, the URL including a pointer to the at least one record, type information associated with the at least one record, and policy information that identifies permissible actions that can be performed on the reference;
   bind, in at least one data structure at the source system, the at least one reference and at least one of a client system and a user of the client system, such that only the at least one of the client system and the user of the client system is permitted to retrieve a copy of the at least one reference after the binding occurs, wherein the at least one reference and the at least one of the client system and the user of the client system are bound when the at least one reference is generated, when the at least one reference is used for a first time, or between a time that the at least one reference is generated and a time that the at least one reference is used for the first time;
   receive, at the source system from a client system, a request to retrieve a copy of the at least one reference from the source system, wherein the copy of the at least one reference is at least one new and unique reference including a pointer to the at least one record and policy information, the request initiated by the client system or the user of the client system using the at least one reference;
   authenticate the at least one of the client system and the user of the client system using at least one of the following: a key, a passphrase, a password, a secret, a PIN, or any combination thereof; and
   transmit the copy of the at least one reference from the source system to the client system after determining that the at least one of the client system and the user of the client system is authorized to copy the at least one reference.

27. The computer program product of claim 26, wherein the at least one reference is generated at a first medical facility, and wherein the client system comprises a central system, a second medical facility, a patient portal, or a workflow management system.

28. The computer program product of claim 26, wherein at least a portion of the at least one reference comprises a token, wherein a remaining portion of the at least one reference must be completed with the token at the client system, and wherein the token is a random number generated by the source system.

29. The computer program product of claim 26, wherein at least a portion of the at least one reference comprises an identifier, the identifier comprising at least one of a national citizen identifier, a social security number, a patient identifier, and a unique identifier generated by the source system, and wherein a remaining portion of the at least one reference is be completed with the identifier at the client system.

30. The computer program product of claim 26, wherein the at least one reference comprises at least one indirect reference, such that the at least one reference indirectly points to the at least one record by pointing to at least one other record, the at least one other record comprising at least one other reference pointing to the at least one record.

31. The computer program product of claim 26, wherein the program instructions, when executed by the at least one computer system, causes the at least one computer system to store the at least one reference in a central index, wherein the central index is configured to be accessible only to a plurality of authorized client systems such that the at least one client system can retrieve copies of URLs with which the at least one client system can retrieve records on behalf of authorized client systems.

32. The computer program product of claim 26, wherein the URL retrieved by the at least one client system is a copy of an original URL.

33. The computer program product of claim 26, wherein the program instructions, when executed by the at least one computer system, cause the at least one computer system to store the at least one reference in an indirect record that comprises a plurality of references pointing to a plurality of other records comprising the at least one record, wherein an indirect reference comprises a pointer to the indirect record.

34. The computer program product of claim 33, wherein the indirect reference comprises a URL and is at least one of the following: printed on a tangible data carrier, stored on a data storage device, stored on a network-accessible service, stored on a printed medium, encoded as a one-dimensional barcode, encoded as a two-dimensional barcode, or any combination thereof.

35. A computer program product for providing decentralized access to records, comprising at least one non-transitory computer-readable medium including program instructions that, when executed by at least one computer system, cause the at least one computer system to:
   generate at least one reference for at least one record stored on a source system, the at least one reference comprising a URL, the URL including a pointer to the at least one record, type information associated with the at least one record, and policy information that identifies permissible actions that can be performed on the at least one reference, and a timeframe within which the reference can be used;
   bind, in at least one data structure at the source system, the at least one reference and at least one of a client system and a user of the client system, such that only the at least one of the client system and the user of the client system is facilitated to perform at least one action on the at least one record on the source system, the at least one action comprising at least one of the following: retrieve the at least one record from the source system, append information to the at least one record, overwrite at least a portion of the at least one record, delete at least a portion of the at least one record, copy the at least one reference, or any combination thereof;
   authenticate the at least one of the client system and the user of the client system using at least one of the following: a key, a passphrase, a password, a secret, a PIN, or any combination thereof; and
   after authenticating the at least one of the client system and the user of the client system, permit the at least one of the client system and the user of the client system to perform the at least one action on the at least one record.

36. The computer program product of claim 35, wherein the at least one reference is generated at a first medical facility, and wherein the client system comprises a central system, a second medical facility, a patient portal, or a workflow management system.

37. The computer program product of claim 36, wherein the at least one reference comprises at least one indirect reference, such that the at least one reference indirectly points to the at least one record by pointing to at least one other record, the at least one other record comprising at least one other reference pointing to the at least one record.

38. The computer program product of claim 35, wherein at least a portion of the at least one reference comprises a token, wherein a remaining portion of the at least one reference must be completed with the token at the client system, and wherein the token is a random number generated by the source system.

39. The computer program product of claim 35, wherein at least a portion of the at least one reference comprises an identifier, the identifier comprising at least one of a national citizen identifier, a social security number, a patient identifier, and a temporary or persistent unique identifier generated by the source system, and wherein a remaining portion of the at least one reference must be completed with the identifier at the client system.

* * * * *

UNITED STATES PATENT AND TRADEMARK OFFICE
CERTIFICATE OF CORRECTION

PATENT NO. : 10,599,830 B2
APPLICATION NO. : 13/962579
DATED : March 24, 2020
INVENTOR(S) : Guido van 'T Noordende It is certified that error appears in the above-identified patent and that said Letters Patent is hereby corrected as shown below:

In the Claims

Column 43, Line 63, Claim 29, delete "is be completed with the identifier" and insert -- is to be completed with the identifier --

Signed and Sealed this
Twenty-second Day of September, 2020

Andrei Iancu
*Director of the United States Patent and Trademark Office*